(12) United States Patent
Shikama et al.

(10) Patent No.: US 7,877,192 B2
(45) Date of Patent: Jan. 25, 2011

(54) CONTROL FOR AN INTERNAL-COMBUSTION ENGINE

(75) Inventors: Mahito Shikama, Wako (JP); Toshinori Tsukamoto, Wako (JP); Hiroyuki Ando, Wako (JP); Hideharu Takamiya, Wako (JP); Toshifumi Hiraboshi, Wako (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 84 days.

(21) Appl. No.: 12/222,790

(22) Filed: Aug. 15, 2008

(65) Prior Publication Data

US 2009/0064967 A1 Mar. 12, 2009

(30) Foreign Application Priority Data

Aug. 21, 2007 (JP) .............................. 2007-215113

(51) Int. Cl.
*G06F 19/00* (2006.01)
*G06G 7/70* (2006.01)

(52) U.S. Cl. ..................... 701/111; 701/104; 701/110; 123/406.24; 123/436

(58) Field of Classification Search .................. 701/103, 701/104, 105, 110, 111; 123/406.24, 406.25, 123/436, 673
See application file for complete search history.

(56) References Cited

U.S. PATENT DOCUMENTS

| | | | |
|---|---|---|---|
| 4,509,477 A * | 4/1985 | Takao et al. ............ 123/339.11 |
| 4,877,003 A * | 10/1989 | Shimomura et al. ..... 123/339.21 |
| 5,740,045 A * | 4/1998 | Livshiz et al. ................ 701/101 |
| 5,740,780 A * | 4/1998 | Shimizu et al. ......... 123/406.22 |
| 6,234,010 B1 * | 5/2001 | Zavarehi et al. ........... 73/114.15 |
| 2007/0163547 A1 * | 7/2007 | Nakasaka .................... 123/478 |

FOREIGN PATENT DOCUMENTS

JP 2000-064899 2/2000

* cited by examiner

*Primary Examiner*—Stephen K Cronin
*Assistant Examiner*—Anthony L Bacon
(74) *Attorney, Agent, or Firm*—Squire, Sanders & Dempsey, LLP

(57) ABSTRACT

A rotational speed parameter is detected in accordance with a rotational speed of the engine. A reference value of the rotational speed parameter is calculated. For each cylinder, an error between the reference value and the rotational speed parameter detected every predetermined crank angle is calculated as a relative speed parameter. For each cylinder, an integrated value is calculated by integrating the relative speed parameters over a predetermined period. For each cylinder, an average value per cylinder of the sum of the integrated values of all the cylinders is calculated. For each cylinder, an error between the integrated value of the cylinder and the average value is calculated. For each cylinder, the output of the engine is controlled in accordance with the error calculated for the cylinder such that variations in the output between the cylinders are suppressed.

42 Claims, 31 Drawing Sheets

(a)

(b)

Crank angle (deg)

Crank angle (deg)

(a)

(b)

CONTROL FOR AN INTERNAL-COMBUSTION ENGINE

BACKGROUND OF THE INVENTION

The present invention relates to a control apparatus and a method for an internal combustion engine (which will be hereinafter referred to as an "engine"), and more specifically relates to a control for suppressing output variations between cylinders and is capable of distinguishing between a deviation in an intake air system and a deviation in a fuel system for each cylinder.

Japanese Patent Application Publication No. 2000-64899 discloses a technique for suppressing variations between cylinders of an engine. According to this technique, an error is calculated between an average that is calculated from the sum of the in-cylinder pressures of all cylinders and an average of the in-cylinder pressure of each cylinder. The amount of fuel supply and the ignition timing are adjusted based on the error thus calculated.

According to the above-referenced technique, variations in the output between cylinders can be suppressed by controlling the fuel supply amount and/or the ignition timing. However, according to this technique, an additional component such as an in-cylinder pressure sensor or the like is required for smoothing output variations of all the cylinders.

Therefore, one object of the present invention is to propose an improved technique that is capable of suppressing variations in the output between cylinders in an easier manner without such an additional component.

Furthermore, variations between cylinders may occur in each of a fuel system and an intake air system. Even when there is no variation in the fuel amount between cylinders, the engine output may vary between the cylinders if there are variations in the intake air amount. On the other hand, even when there is no variation in the intake air amount between cylinders, the engine output may vary between the cylinders if there are variations in the fuel supply amount between the cylinders. In order to more accurately smooth the outputs of the cylinders, it is desirable to identify how much variations there are in each of the fuel amount and the intake air amount.

SUMMARY OF THE INVENTION

According to one aspect of the present invention, a control for suppressing variations in the output between cylinders of an engine is provided. A rotational speed parameter (OMG) is detected in accordance with a rotational speed of the engine. A reference value of the rotational speed parameter is calculated. For each cylinder, an error between the reference value and the rotational speed parameter detected every predetermined crank angle is calculated as a relative speed parameter (OMGREF). For each cylinder, an integrated value (MFJUD) is calculated by integrating the relative speed parameter over a predetermined period. A first average value per cylinder (TRQPARM) of the sum (TRQALL) of the integrated values of all of the cylinders is calculated. For each cylinder, an error (DTRQPARM) between the integrated value of the cylinder and the first average value is calculated. For each cylinder, the engine output is controlled in accordance with the error calculated for the cylinder such that the output variations between the cylinders are suppressed.

The inventors found that an integrated value of the relative rotational speed parameter calculated for each cylinder represents an output torque of the cylinder. Therefore, by using this integrated value, the output variations between cylinders can be suppressed with an easier approach. Furthermore, because the relative rotational speed can be obtained from the output of a crank angle sensor that is conventionally mounted on a vehicle, an additional sensor is not required. Therefore, any change is not required for the conventional engine structure. The output variations can be suppressed without increasing cost.

According to one embodiment of the invention, for each cylinder, a second average value is calculated by averaging the integrated value of the cylinder over a predetermined period when the engine is in a predetermined operating condition. In this case, the above first average value is an average value per cylinder of the sum of the second average values of all of the cylinders. The above error is an error for each cylinder between the second average value of the cylinder and the (first) average value per cylinder of the sum of the second average values of all of the cylinders.

As described above, because the integrated value calculated for a cylinder represents the output torque of the cylinder, an average value (the second average value) obtained by averaging the integrated value over a predetermined period represents an output torque of the cylinder per unit of time period. Thus, the output variations between the cylinders can be detected by using the second average value. Furthermore, because the calculation is performed when the engine is in a predetermined operating condition, the calculation can be performed, for example when the engine output is stable, so that the error for each cylinder is more accurately calculated.

According to one embodiment of the invention, based on the operating condition of the engine, it is determined whether or not correction for an amount of fuel supplied to each cylinder and correction for an ignition timing at which an air-fuel mixture is ignited in each cylinder are permitted. One or both of the fuel supply amount and the ignition timing for which the correction is permitted are corrected for each cylinder, thereby suppressing variations in the output between the cylinders.

Thus, variations in the output between the cylinders can be suppressed by correcting one or both of the fuel supply amount and the ignition timing. Because the correction permission is determined before the actual correction, the engine operating condition can be prevented from becoming unstable due to the correction.

According to one embodiment of the invention, based on the operating condition of the engine, it is determined whether or not correction for an amount of fuel supplied to each cylinder, correction for an ignition timing at which an air-fuel mixture is ignited in each cylinder and correction for a lift amount of an intake valve of each cylinder are permitted. One or more of the fuel supply amount, ignition timing and lift mount for which the correction is permitted are corrected for each cylinder, thereby suppressing variations in the output between the cylinders.

Thus, the output variations between the cylinders can be suppressed based on not only the fuel supply amount and the ignition timing but also the lift amount. Furthermore, because the correction permission is determined before the actual correction, the engine operating condition can be prevented from becoming unstable due to the correction.

According to another aspect of the present invention, a rotational speed parameter (OMG) is detected in accordance with a rotational speed of the engine. A reference value of the rotational speed parameter is calculated. For each cylinder, an error between the reference value and the rotational speed parameter detected every predetermined crank angle is calculated as a relative speed parameter (OMGREF). For each cylinder, an integrated value (MFJUD) is calculated by integrating the relative speed parameter over a predetermined period. For each cylinder, an ignition timing correction amount is determined based on the integrated value of the cylinder such that outputs of all the cylinders are smoothed. A fuel amount is controlled for each cylinder such that air-fuel ratios of all the cylinders are smoothed. For each cylinder, a deviation amount of an intake air amount of the cylinder from a first desired value and a deviation amount of the fuel amount of the cylinder thus controlled from a second desired value are distinguishably identified. Here, the first desired value indicates an intake air amount when there is no variation in the intake air amount between the cylinders. The second desired value indicates a fuel amount when there is no variation, between the cylinders, in the fuel amount for smoothing the air-fuel ratios of all the cylinders.

Thus, it is identified, for each cylinder, how much of the intake air amount deviates and how much of the fuel amount deviates based on the ignition timing correction amount determined for smoothing the outputs of the cylinders. The deviation can be identified for each cylinder. The deviation of the intake air amount and the deviation of the fuel amount can be distinctly identified. Therefore, it can be clearly determined for each cylinder which of the intake air system and the fuel system has an abnormality.

According to one embodiment of the invention, for each cylinder, the deviation amount of the intake air amount is determined in accordance with the ignition timing correction amount. For each cylinder, the deviation amount of the fuel amount is determined in accordance with the deviation amount of the intake air amount. Thus, a deviation amount can be determined for each of the intake air amount and the fuel amount from the ignition timing correction amount.

According to one embodiment of the invention, a first table for defining a correlation between the ignition timing correction amount and the deviation amount of the intake air amount from the first desired value when the air/fuel ratios of all the cylinders are maintained at a predetermined value is provided. The deviation amount of the intake air amount of each cylinder can be determined by referring to the first table based on the ignition timing correction amount.

The ignition timing correction amount is a correction amount used for smoothing the outputs of all the cylinders. Therefore, the ignition timing correction amount has a correlation with the current deviation amount of the intake air amount under the condition where all the cylinders are maintained at a predetermined air/fuel ratio (for example, the stoichiometric air/fuel ratio). Thus, according to this invention, it can be determined how much of the intake air amount deviates based on the ignition timing correction amount.

According to one embodiment of the invention, the first desired value is a predetermined value that is established in advance in accordance with an operating condition of the engine. Therefore, the deviation amount of the intake air amount is determined as a deviation from the predetermined value.

According to one embodiment of the invention, a second table defining a correlation between the deviation amount of the intake air amount from the first desired value and a first fuel correction amount when there is no variation, between the cylinders, in the fuel amount for smoothing the air/fuel ratios of all the cylinders is provided. The first fuel correction amount of each cylinder is determined as the second desired value by referring to the second table based on the deviation amount of the intake air amount. In one embodiment, for each cylinder, a second fuel correction amount of fuel supplied to the cylinder is determined to control the fuel amount supplied to the cylinder. A deviation amount of the second fuel correction amount from the second desired value (that is, the first fuel correction amount) is calculated as a deviation amount of the fuel amount.

Under the condition where variations in the fuel amount for smoothing the air/fuel ratios of all the cylinders do not exist between the cylinders (in other words, where variations do not exist in the fuel system between the cylinders), the deviation amount of the intake air amount has a correlation with the fuel correction amount. Therefore, the first fuel correction amount can be determined from the deviation amount of the intake air amount by using this correlation.

The first fuel correction amount is a fuel correction amount in the case where no variation exists in the fuel system. Therefore, by comparing the first fuel correction amount with the second fuel correction amount, it can be determined whether or not variations actually exist in the smoothing operation for the fuel system.

According to one embodiment of the invention, it is determined for each cylinder that there is an abnormality in an intake air system of the cylinder if the deviation amount of the intake air amount exceeds a predetermined value. Furthermore, according to one embodiment, it is determined for each cylinder that there is an abnormality in a fuel system of the cylinder if the deviation amount of the fuel amount for the cylinder exceeds a predetermined value. Thus, it can be identified which system of which cylinder has an abnormality.

According to one embodiment of the invention, the control apparatus is capable of variably controlling a lift amount of an intake valve of the engine and is capable of controlling a pressure of an intake manifold of the engine. If the deviation amount of the intake air amount of any one of the cylinders exceeds a predetermined value, the lift amount is increased while decreasing the pressure, for all the cylinders.

Such a control makes the deviation amount of the intake air amount relatively smaller with respect to the lift amount, so that the magnitude of the deviation does not affect the smoothing operation for the intake air amount (in other words, the deviation is made negligible). In order to maintain a desired intake air amount, the pressure of the intake manifold is controlled to be smaller as the lift amount increases (more specifically, because the pressure of the intake manifold is a negative pressure, an absolute value of that negative pressure is increased).

According to one embodiment of the invention, a process for identifying the deviation amount for the intake air amount and the fuel amount is performed when the engine is in an idle operating condition. Because the idle operating condition is a stable condition, the deviation amount for the intake air system and the fuel system for each cylinder can be stably determined.

DESCRIPTION OF THE PREFERRED EMBODIMENTS

Figure 1:
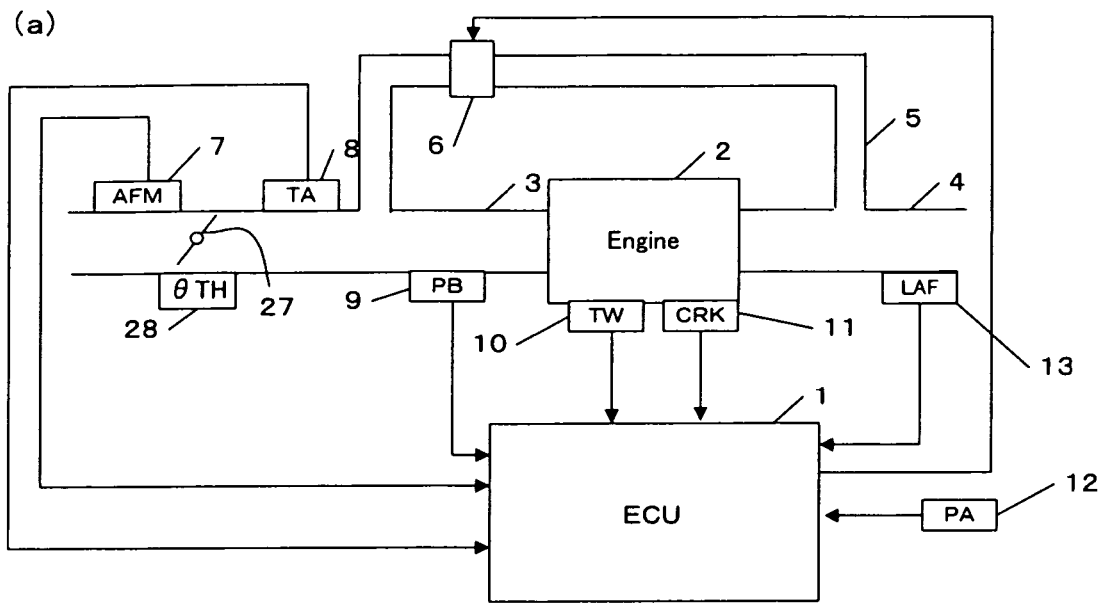
FIG. 1 is a block diagram showing an overall structure of an engine and its control unit in accordance with one embodiment of the present invention.
Figure 1:
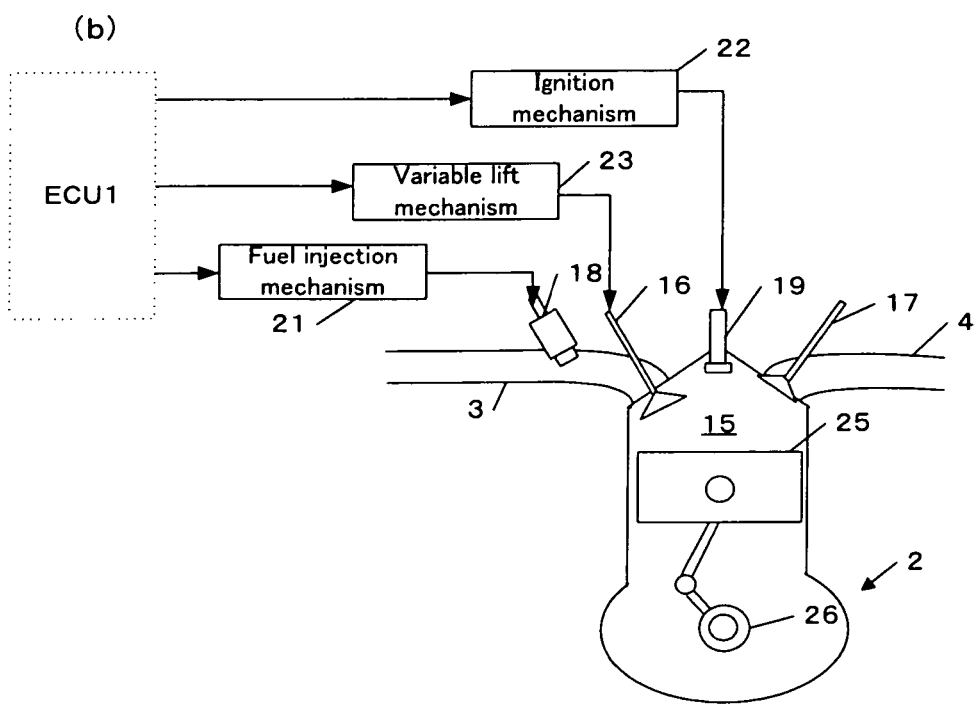

Preferred embodiments of the present invention will be described referring to the accompanying drawings. FIG. 1 is a block diagram showing an overall structure of an engine and its control unit in accordance with one embodiment of the present invention.

Referring to FIG. 1(a), an electronic control unit (hereinafter referred to as an "ECU") 1 is a computer having a central processing unit (CPU) and a memory. One or more computer programs for implementing various controls for a vehicle and data (including maps) required for executing those programs may be stored in the memory. One or more programs for implementing a control and data required for the programs in accordance with the invention may be also stored in the memory. The ECU 1 receives data sent from each section of the vehicle and performs operations using the received data to generate control signals for controlling each section of the vehicle.

The engine 2 has six cylinders in this embodiment. The engine 2 is provided with an intake manifold 3 and an exhaust manifold 4.

An EGR passage 5 is connected between the intake manifold 3 and the exhaust manifold 4. Exhaust gas in the exhaust manifold 4 is re-circulated into the intake manifold 3 through the EGR passage 5 so that the exhaust gas is supplied to each cylinder. The amount of the recirculated exhaust gas can be adjusted by an EGR valve 6. An opening degree of the EGR valve 6 is changed in accordance with a control signal from the ECU 1.

In the intake manifold 3, an airflow meter (AFM) 7 for detecting an airflow passing through the intake manifold 3, an intake air temperature sensor 8 for detecting a temperature TA in the intake manifold 3 and an intake manifold pressure sensor 9 for detecting a pressure PB in the intake manifold 3 are disposed. Detection values of these sensors are sent to the ECU 1. The ECU 1 calculates a gauge pressure (a difference pressure of the intake manifold pressure with respect to the atmospheric pressure) based on the detection value of the intake manifold pressure sensor 9. The intake manifold 3 is branched toward the cylinders in the downstream of the intake manifold pressure sensor 9.

A water temperature sensor 10 for detecting a temperature TW of cooling water of the engine 2 and a crank angle sensor 11 are provided in the engine 2. The crank angle sensor 11 outputs a CRK signal and a TDC signal in accordance with rotation of a crankshaft 26 (refer to FIG. 1(b)). The CRK and TDC signals are sent to the ECU 1. The CRK signal is output every predetermined crank angle. The ECU 1 calculates a rotational speed NE of the engine 2 in accordance with the CRK signal. The TDC signal is output at a crank angle that is associated with a top dead center (TDC) position of a piston 25 (refer to FIG. 1(b)). In addition, a PA sensor 12 for detecting the atmospheric pressure PA is connected to the ECU 1.

An air/fuel ratio (LAF) sensor 13 is disposed upstream of a device (not illustrated in the drawings) for purifying the exhaust gas in the exhaust manifold of the engine 2. The air-fuel ratio sensor 13 detects the air/fuel ratio linearly over a range from rich to lean for the engine 2. A detection value of the air/fuel sensor 13 is sent to the ECU 1.

FIG. 1(b) shows one of the cylinders mounted on the engine 2. A combustion chamber 15 of the cylinder is connected to the intake manifold 3 through an intake valve 16 and the exhaust manifold 4 through an exhaust valve 17. A fuel injection valve 18 is provided in the intake manifold 3. A fuel injection mechanism 21 drives the fuel injection valve 18 for injecting fuel in accordance with a control signal from the ECU 1. A combination of the fuel injection valve 18 and the fuel injection mechanism 21 is referred to as a fuel supply apparatus.

A spark plug 19 is attached in such a manner as to protrude into the combustion chamber 15. An ignition mechanism 22 drives the spark plug 19 to generate a spark in accordance with a control signal from the ECU 1. The spark enables a mixture of the injected fuel and the air to burn inside the combustion chamber 15. A combination of the spark plug 19 and the ignition mechanism 22 is referred to as an ignition apparatus.

The volume of the air-fuel mixture increases through the combustion, so that the piston 25 is pushed downward. The reciprocating movement of the piston 25 is converted to a rotational movement of the crankshaft 26.

A variable lift mechanism 23 changes a lift amount of the intake valve 16 in accordance with a control signal from the ECU 1. Through the lift amount, the amount of air to be taken into the combustion chamber 15 can be adjusted. The variable lift mechanism 23 may be configured in any appropriate manner. For example, Japanese Patent Application Publication No. 2004-36560 proposes a variable lift mechanism in which a pair of link arms are connected to a rocker arm of a cam and an end of one of the link arms is displaced steplessly, so that the lift amount can be changed steplessly. The variable lift mechanism 23 includes a lift amount sensor (not illustrated) for detecting the lift amount of the intake valve 16 of each cylinder. The lift amount sensor may be implemented in any appropriate manner (for example, by using a potentiometer).

In this embodiment, a throttle valve 27 is provided in the intake manifold 3 as shown in FIG. 1(a) in addition to the variable lift mechanism 23. A throttle mechanism (not illustrated) for controlling an opening degree of the throttle valve in accordance with a control signal from the ECU 1 is connected to the throttle valve 27. The amount of air to be taken into the combustion chamber 15 can be controlled by adjusting the opening degree of the throttle valve 27. In the following embodiments, although the intake air amount is controlled mainly by the variable lift mechanism 23, the control of the throttle valve 27 can be implemented depending on the operating condition of the engine 2 (for example, the engine output and/or the engine load). A throttle valve opening (θTH) sensor 28 for detecting the opening degree of the throttle valve is connected to the throttle valve 27. A detection value of this sensor is sent to the ECU 1.

Although not illustrated in the drawings, a variable phase mechanism that is capable of changing the phase of the intake valve 16 and/or the exhaust valve 17 may be provided in the engine. Furthermore, a phase sensor for detecting the phase of the intake valve 16 and/or the exhaust valve 17 may be provided independently of the presence or absence of the variable phase mechanism. The phase sensor can be implemented in any appropriate manner. By using the phase sensor to detect the phase (an advance amount) of an opening timing of the intake valve with respect to the crankshaft, an overlap period during which both of the intake valve and the exhaust valve are open can be determined.

Figure 2:
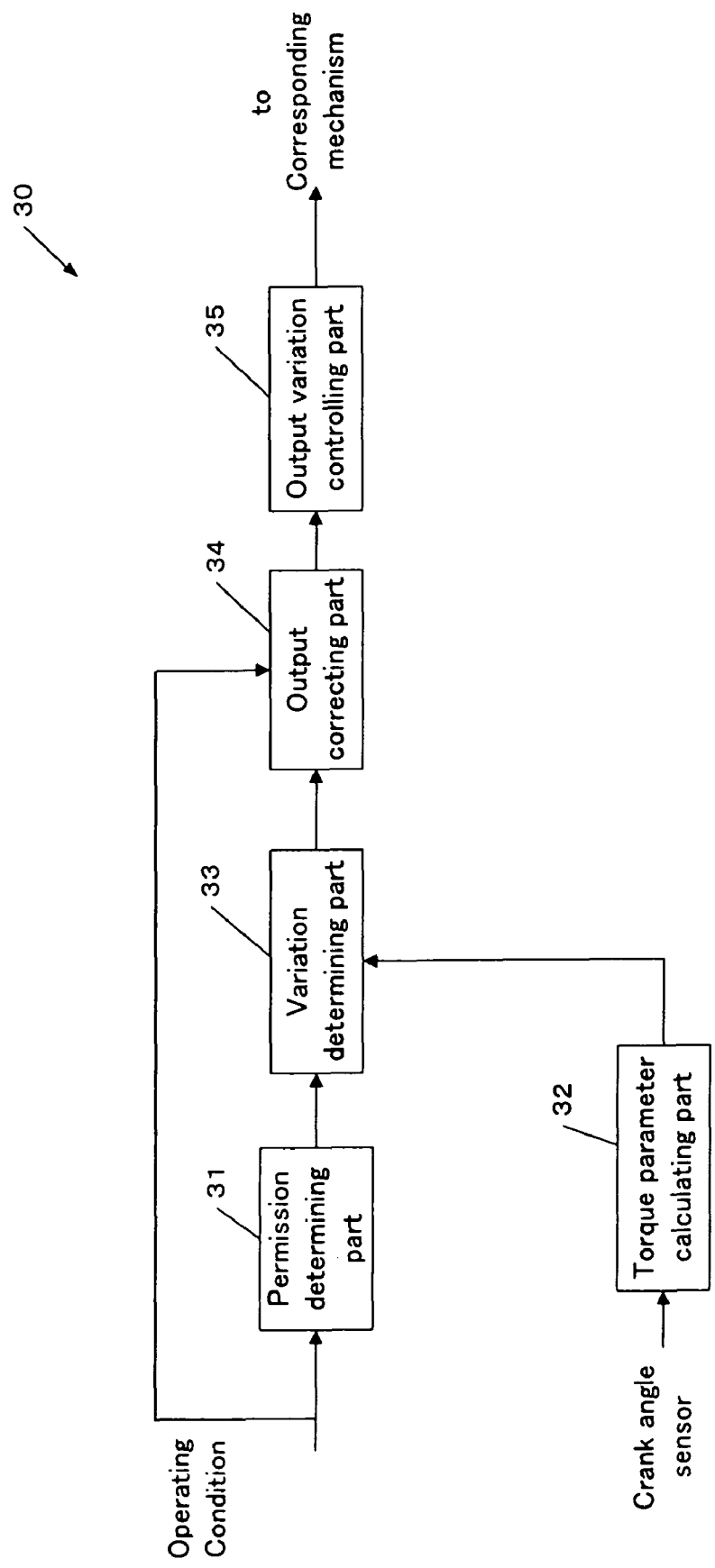
FIG. 2 is a functional block diagram of an output variation suppressing apparatus in accordance with one embodiment of the present invention.

FIG. 2 shows a functional block diagram of a control apparatus 30 for suppressing variations in the output between cylinders in accordance with one embodiment of the present invention. The functional blocks are implemented in the ECU 1.

A permission determining part 31 determines whether or not execution of a process for suppressing variations in the output between cylinders is permitted. In this embodiment, the execution of the process is permitted when the engine is in an idle operating state. This is because the output variations between (among) the cylinders can be relatively stably detected when the engine output is low and stable.

Alternatively, another condition may be used to permit the execution of the process. For example, instead of the idle operating state or in addition to the idle operating state, an engine load (which can be determined based on the intake manifold pressure PB detected by the intake manifold pressure sensor 9 (FIG. 1)), an intake air amount that can be detected in the airflow meter 7, an engine water temperature TW detected by the water temperature sensor 10, an intake air temperature TA detected by the intake air temperature sensor 8, a lift amount of the intake valve 16 detected by the lift amount sensor, an overlap period of the intake valve and the exhaust valve, a re-circulated amount of the exhaust gas (EGR amount) that can be detected from the opening degree of the EGR valve 6, or the like may be used.

A torque parameter calculating part 32 calculates, for each cylinder, a torque parameter representing an output torque of the cylinder. Details of the calculation method will be described later.

In response to the permission by the permission determining part 31, a variation determining part 33 uses the torque parameter calculated by the torque parameter calculating part 32 to determine variations in the output torque between the cylinders. Details of the determination method will be described later.

An output correcting part 34 determines an operating parameter to be currently corrected by determining, based on the operating condition of the engine 2, which one or more of the operating parameters that are capable of changing the output torque of the engine 2 are permitted for the correction. Through such determination of the operating parameter, the operating condition of the engine 2 can be prevented from becoming unstable due to the correction of the operating parameter. Based on the result of the determination, the output correcting part 34 corrects the determined operating parameter for each cylinder so as to suppress variations in the output between the cylinders. The fuel amount supplied to the engine, the ignition timing, and the intake air amount (amount of air introduced into the engine) are used as such an operating parameter in this embodiment.

Alternatively, another operating parameter that is capable of changing the output torque of the engine 2 may be used. For example, a valve-opening timing (phase) of the intake valve may be used as an operating parameter.

An output variation controlling part 35 generates, for each cylinder, a control signal in accordance with the corrected operating parameter and sends the control signal to a corresponding mechanism. For example, in the case where the operating parameter is the fuel supply amount, a control signal representing the corrected fuel supply amount is generated for each cylinder. The fuel injection mechanism 21 drives the fuel injection valve 18 of each cylinder in accordance with the received control signal so that the corrected fuel supply amount is supplied to the corresponding cylinder. In the case where the operating parameter is the ignition timing, a control signal representing the corrected ignition timing is generated for each cylinder. The ignition mechanism 22 drives the spark plug 19 of each cylinder in accordance with the received control signal so that the corrected ignition timing is implemented in the corresponding cylinder. In the case where the operating parameter is the intake air amount, a control signal representing the corrected intake air amount is generated for each cylinder. The variable lift mechanism 23 controls the lift amount of the intake valve 16 of each cylinder in accordance with the received control signal so that the corrected intake air amount is supplied to the corresponding cylinder. Thus, the output torque is corrected in accordance with the corrected operating parameter(s) for each cylinder, so that variations in the output between the cylinders are suppressed.

Figure 3:
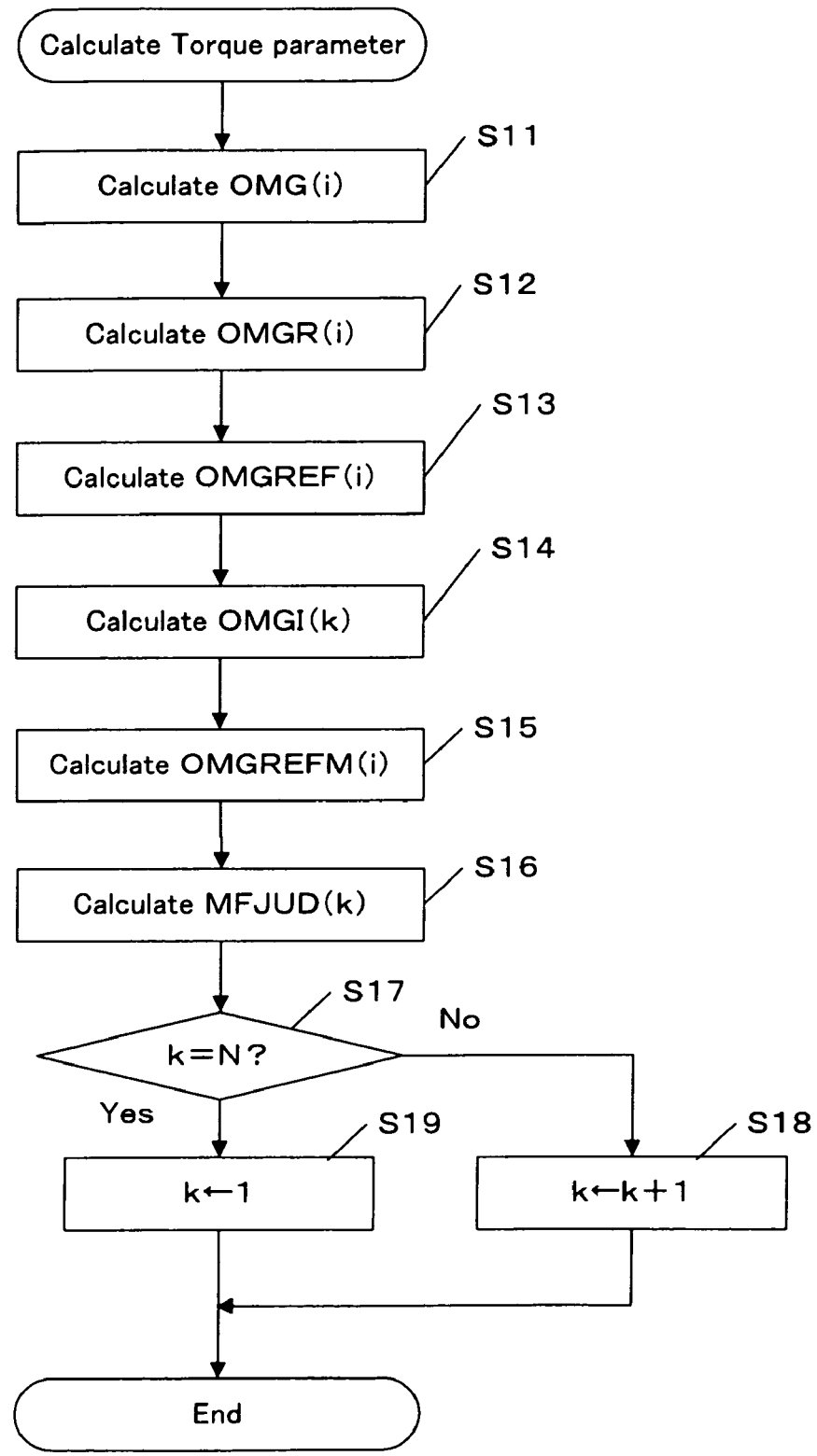
FIG. 3 is a flowchart of a process for calculating a torque parameter in accordance with a first embodiment of the present invention.

FIG. 3 shows a process performed by the CPU of the ECU 1, more specifically, performed by the torque parameter calculating part 32 of FIG. 2, in accordance with one embodiment of the present invention. Now, this process will be described referring to FIG. 4 through FIG. 6. The process is executed in synchronization with the TDC pulse.

In this embodiment, the CRK pulse from the crank angle sensor 11 is obtained every six degrees of the crank angle. Data of a time parameter $CRME(i)$ (which indicates a time interval of generation of the CRK pulse) corresponding to an angular range of 720 degrees of the crank angle ($i=0$ to $ND-1$; the data number ND is 120) are stored in the memory of the ECU 1. Further, assuming that a cylinder discrimination number, which is numbered in the order of ignition, is represented by k ($k=1$ to 6) and the number of data corresponding to one TDC period is represented by NTDC (which is 20 in this example), calculations in which the parameter i takes values from $(k-1)NTDC$ to $(kNTDC-1)$ are performed during one execution of the process. For example, when the current process performs the calculations corresponding to the first cylinder ($k=1$), the parameter i takes values from 0 to ($NTDC-1$), and when it performs the calculations corresponding to the fifth cylinder ($k=5$), the parameter i takes values from $4NTDC$ to ($5NTDC-1$).

In step S11, a rotational speed $OMG(i)$ (rad/s) is calculated according to the equation (1). The rotational speed OMG, which represents a rotational speed of the crankshaft 26, is obtained by converting the time interval of generation of the CRK pulse into an angular velocity. Here, $D\theta$ is an angular interval $4\pi/ND$ of measuring the time parameter CRME and it is $\pi/30$ (rad) in this embodiment.

$$OMG(i)=D\theta/CRME(i) \qquad (1)$$

Figure 4:
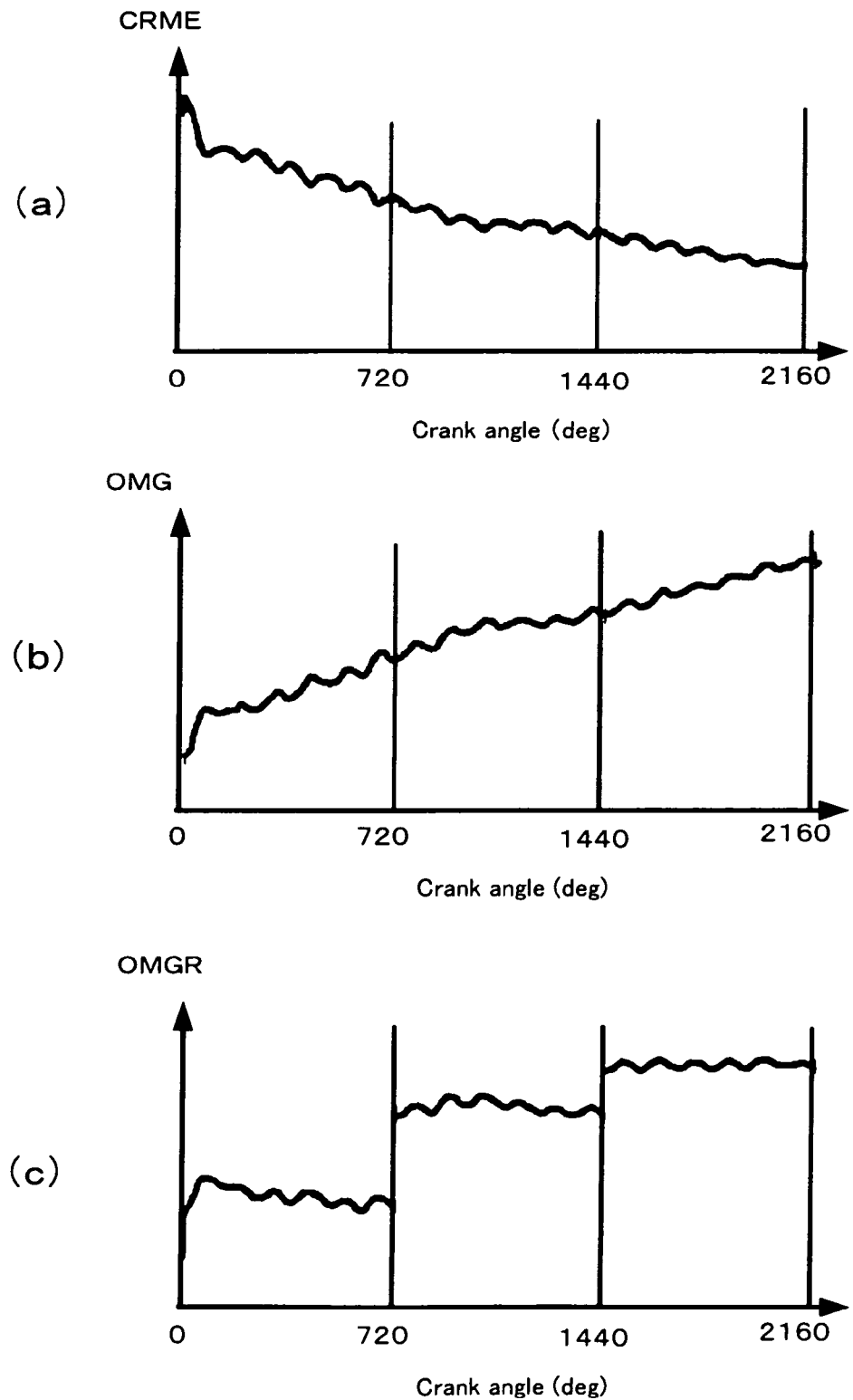
FIG. 4 shows changes in parameters used for calculating a torque parameter in accordance with one embodiment of the present invention.

FIG. 4(*a*) shows, as an example, changes in the time parameter CRME when the engine rotational speed NE increases and FIG. 4(*b*) shows the corresponding rotational speed OMG.

In step S12, a 720-degree filtering process is performed according to the equation (2) to calculate a filtered rotational speed $OMGR(i)$.

$$OMGR(i)=OMG(i)-(OMG(ND)-OMG(0))\times D\theta \times i/4\pi \qquad (2)$$

The 720-degree filtering process extracts variations having a comparatively short period by canceling linearly changing components in one combustion cycle (that is, 720 degrees of crank angle). This process is performed to remove rotational changing components that are caused by a torque applied to the engine from a load side of the engine (such as a torque applied from wheels of the vehicle and auxiliary components driven by the engine, a torque due to the friction of the sliding parts of the engine, or the like). FIG. 4(*c*) shows changes in the OMGR calculated based on FIG. 4(*b*).

In step S13, a relative rotational speed OMGREF is calculated according to the equation (3).

$$OMGREF(i)=OMGR(i)-OMGR((k-1)NTDC) \qquad (3)$$

Here, $OMGR((k-1)NTDC)$ is a reference rotational speed, which corresponds to the filtered rotational speed at the compression TDC of the cylinder subjected to the calculation process.

Figure 5:
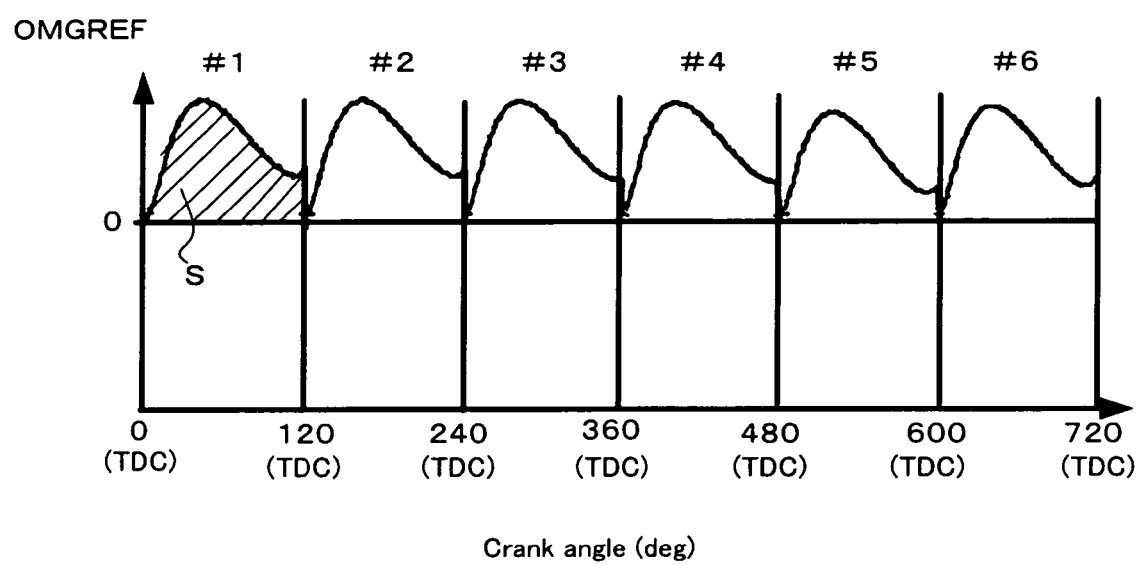
FIG. 5 shows changes in a parameter used for calculating a torque parameter in accordance with one embodiment of the present invention.
Figure 6:
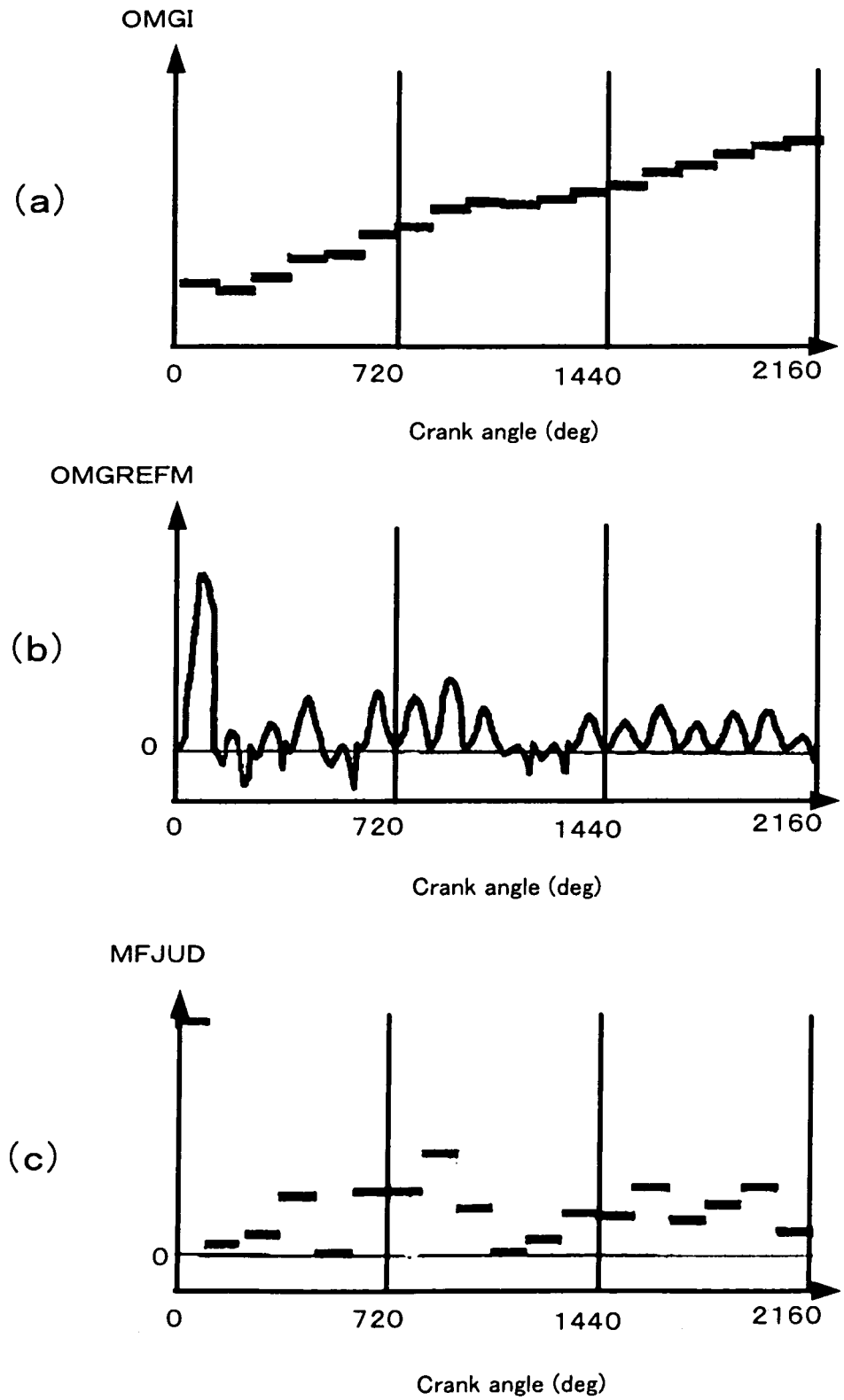
FIG. 6 shows changes in parameters used for calculating a torque parameter in accordance with one embodiment of the present invention.

FIG. 5 shows, as an example, a behavior of the relative rotational speed OMGRFF during a period of the crank angle from 0 to 720 degrees. #1 to #6 are cylinder discrimination numbers that are assigned for discriminating the six cylinders in the order of ignition. After the compression top dead center, the relative rotational speed OMGREF increases due to the combustion of the mixture of the fuel and air and then decreases. If a misfire occurs, the relative rotational speed descends without rising after the compression top dead center.

An area S (shaded portion) surrounded by the relative rotational speed OMGREF represents a torque generated by the combustion. Therefore, an integrated value obtained by integrating, for each cylinder, the relative rotational speeds OMGREF during one TDC period (which is the period of 120 degrees of the crank angle in this embodiment) can be used as a torque parameter representing a torque generated in the cylinder.

Preferably, prior to calculating the above-described integrated value, steps S14 and S15 are performed to remove the influence of the inertia torque influence from the relative rotational speed. The inertia torque is a torque based on the inertial force of rotating parts on the load side of the engine such as a mass of reciprocating parts (pistons and connecting rods) of the engine 2, a length of the connecting rod, a crank radius, a crank pulley, a torque converter, a lockup clutch or the like. Components based on the inertial force are contained in the relative rotational speed. It is preferable to remove the inertia torque because the inertia torque does not contribute to an output torque that is generated by the combustion.

In step S14, an inertial force rotational speed $OMGI(k)$ at the compression top dead center for each cylinder is calculated according to the equation (4).

$$OMGI(k)=K\cdot OMG((k-1)NTDC)/3I \qquad (4)$$

Here, K represents a proportionality constant and I represents an inertia moment of rotating parts such as a crank pulley and a torque converter. The grounds for the equation (4) will be described later. In addition, it is preferable to change the value of the inertia moment I in accordance with whether a lockup clutch of an automatic transmission (not illustrated in the drawings) is engaged or not. Thus, more accurate calculations of the torque parameter can be performed regardless of whether the lockup clutch is engaged or not.

FIG. 6(a) shows, as an example, changes in the inertial force rotational speed OMGI calculated at the same timing when the reference rotational speed is calculated in the vicinity of the compression TDC of each cylinder.

In step S15, a modified relative rotational speed OMGREFM(i) is calculated according to the equation (5). The modified relative rotational speed represents a relative rotational speed in which the influence of the inertia torque has been removed.

$$OMGREFM(i)=OMGREF(i)+OMGI(k) \qquad (5)$$

FIG. 6(b) shows, as an example, changes in the modified relative rotational speed for each cylinder.

In step S16, a torque parameter MFJUD(k) is calculated by integrating the modified relative rotational speed OMGREFM in accordance with the equation (6).

$$MFJUD(k) = \sum_{i=(k-1)NTDC}^{kNTDC-1} OMGREFM(i) \qquad (6)$$

FIG. 6(c) shows, as an example, changes in the torque parameter MFJUD of each cylinder calculated by integrating the modified relative rotational speeds OMGREFM over one TDC period.

In step S17, it is determined whether or not the cylinder discrimination number k is equal to the number of the cylinders N. If the answer in step S17 is No, the cylinder discrimination number k is incremented by 1 (S18). If the answer is Yes, the cylinder discrimination number k is returned to 1 (S19).

Thus, for each cylinder, the torque parameter MFJUD representing the output torque of the cylinder is calculated in synchronization with the TDC pulse.

Figure 7:
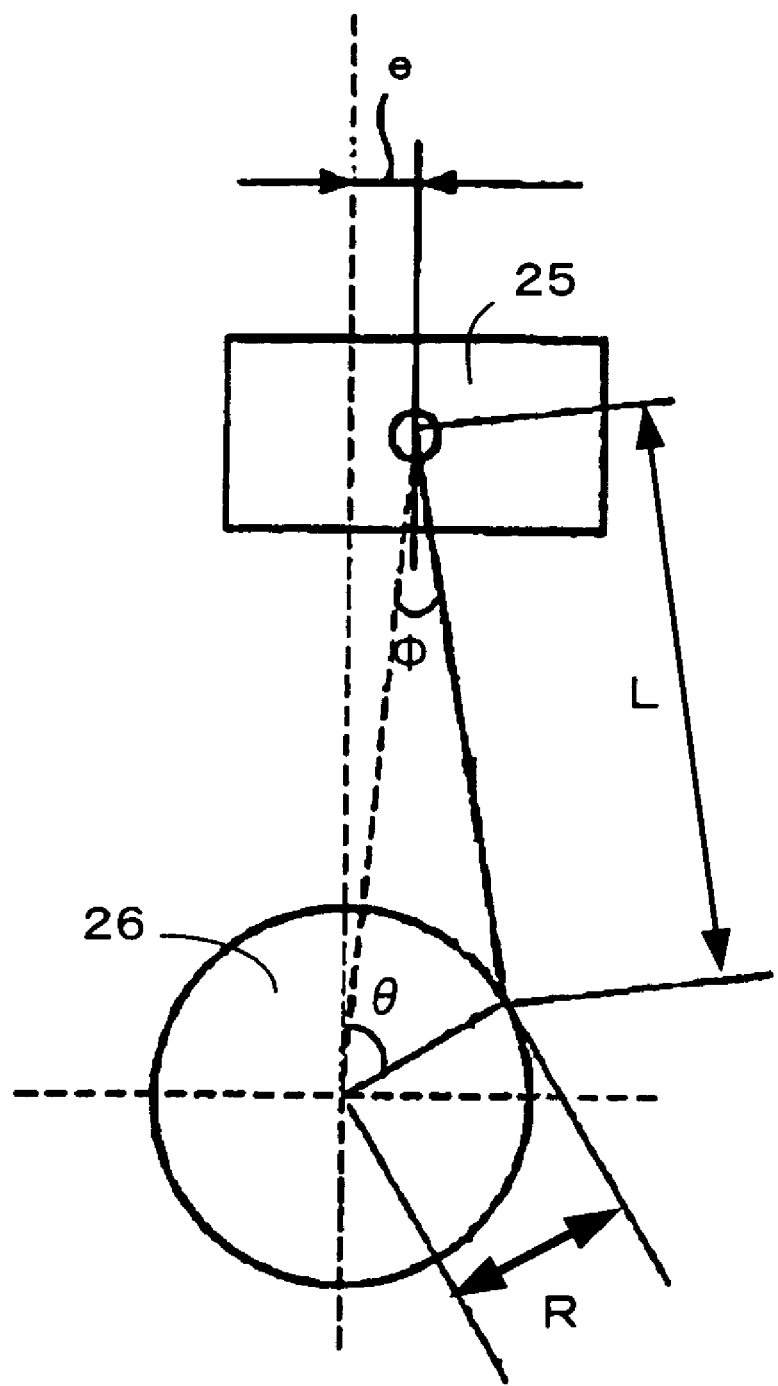
FIG. 7 shows a technique for calculating an inertia torque caused by a movement of reciprocating parts of an engine in accordance with one embodiment of the present invention.

Now, a manner for calculating the inertial force rotational speed OMGI will be described in more details. A torque TI1 by the inertial force generated in one cylinder (such torque TI1 will be hereinafter referred to as a "single cylinder inertia torque) is given by the equation (7). As shown in FIG. 7, a length of the connecting rod is L, a crank radius is R, an offset is e, a rotational angular speed of the crankshaft 26 is ω, a total mass of the piston 25 and the connecting rod is m. Angles θ and φ are defined as illustrated in FIG. 7. In the equation (7), the radian (rad) is used as a unit of angle.

$$TI1 = -mR^2\varpi^2(\cos\theta + e\sin\theta/L + R\cos2\theta/L) \cdot \cos\left\{\frac{\pi}{2} - (\phi + \theta)\right\}/\cos\phi \qquad (7)$$

Figure 8:
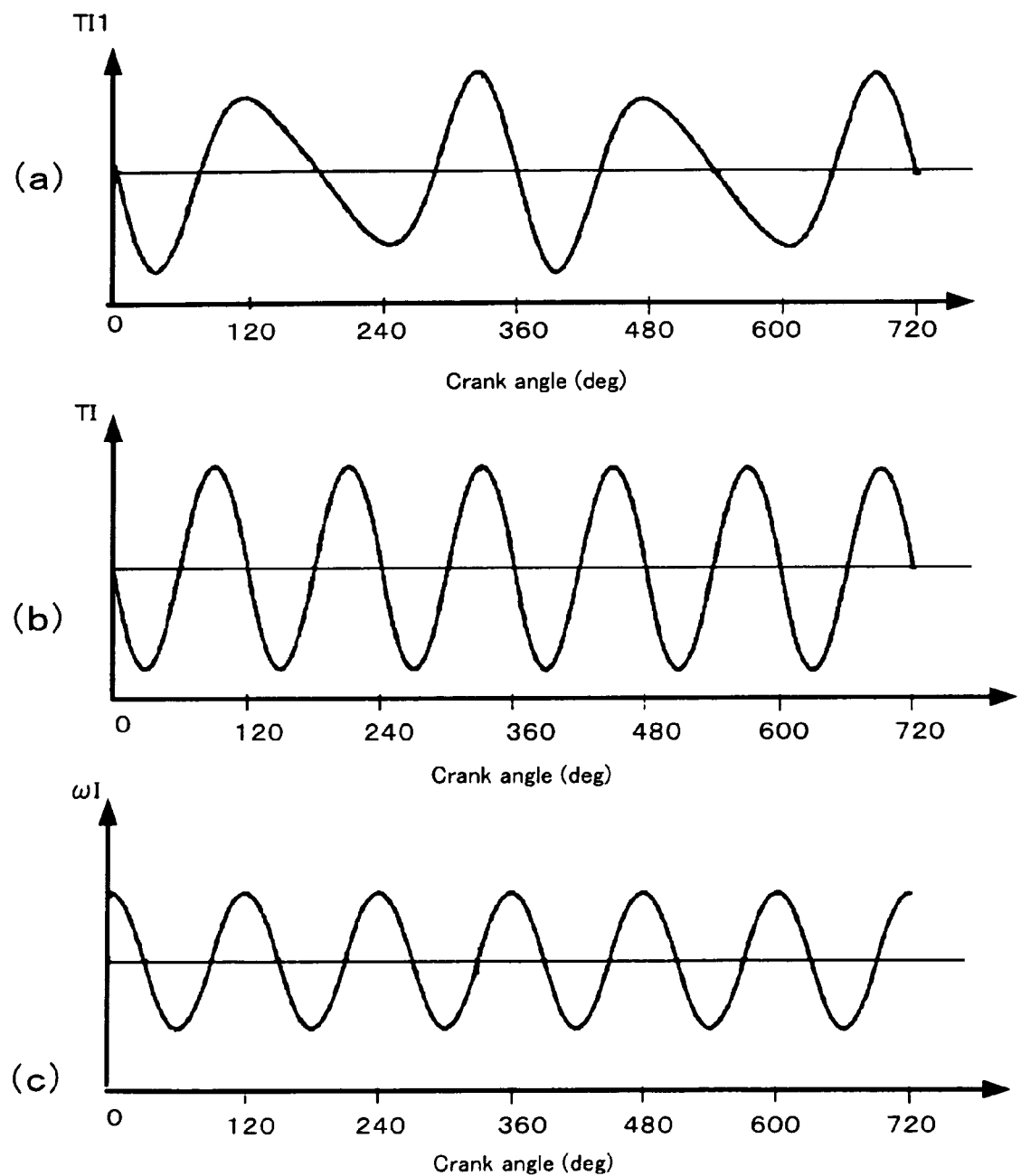
FIG. 8 shows a single cylinder inertia torque, a combined inertia torque and an inertia force rotational speed in accordance with one embodiment of the present invention.

FIG. 8(a) shows the single cylinder inertia torque TI1 calculated by the equation (7) as a function of the crank angle θ. A combined inertia torque TI is obtained by adding six single cylinder inertia torques TI1 with 120-degree phase shift changes as shown in FIG. 8(b). The combined inertia torque TI can be approximated according to the equation (8).

$$TI=-A\sin 3\theta \qquad (8)$$

Here, "A" represents a coefficient that is proportional to the square of the rotational angular speed ω(rad/s).

On the other hand, if the inertia moment is represented by "I" as described above, the combined inertia torque TI is given by the equation (9).

$$TI=I\times(d\omega/dt) \qquad (9)$$

The equation (10) is obtained from the equation (8) and the equation (9). By solving the equation (10) for the rotational angular speed ω, the inertial force rotational speed ωI corresponding to the combined inertia torque TI is given by the equation (11).

$$-A\sin 3\theta=I\times(d\omega/dt) \qquad (10)$$

$$\omega I=(A\cos 3\theta \times dt/d\theta)/3I \qquad (11)$$

FIG. 8(c) shows changes in the inertial force rotational speed ωI.

Accordingly, the inertial force rotational speed OMGI at the compression TDC is calculated according to the equation (12) which is obtained by applying zero to θ of the equation (11).

$$OMGI=(A/3I)(1/OMG) \qquad (12)$$

Because the coefficient A is proportional to the square of the rotational speed OMG, the equation (12) can be transformed to the equation (13) where K is a proportionality constant.

$$OMGI=K \cdot OMG/3I \qquad (13)$$

Therefore, the inertial force rotational speed OMGI at the compression top dead center of each cylinder can be expressed by the above-described equation (4).

As shown in FIG. 8(c), the inertial force rotational speed OMGI takes a maximum value at the compression top dead center (θ=0, 120, 240, . . . ). Accordingly, the modified relative rotational speed OMGREFM can be obtained by adding the inertial force rotational speed OMGI to the relative rotational speed OMGREF (this addition being equivalent to subtracting the inertial force rotational speed OMGI from the reference rotational speed) to eliminate the influence of the inertial force rotational speed WI. In this regard, periodic changing components in the inertial force rotational speed ωI shown in FIG. 8(c) are canceled by integrating the modified relative rotational speeds OMGREFM during one TDC period (120 degrees in this embodiment).

Figure 9:
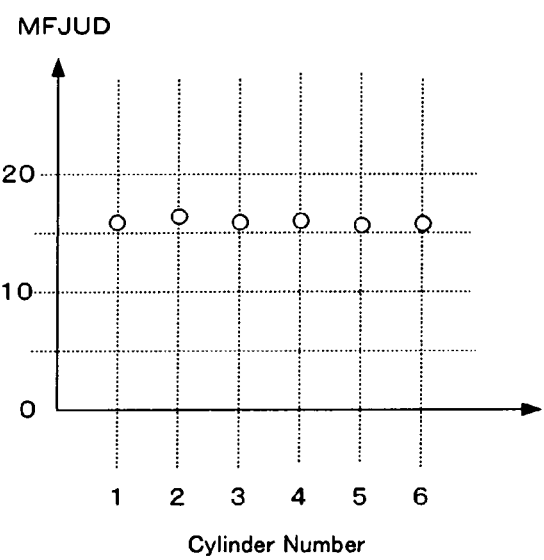
FIG. 9 shows a torque parameter for each cylinder in accordance with one embodiment of the present invention.
Figure 9:
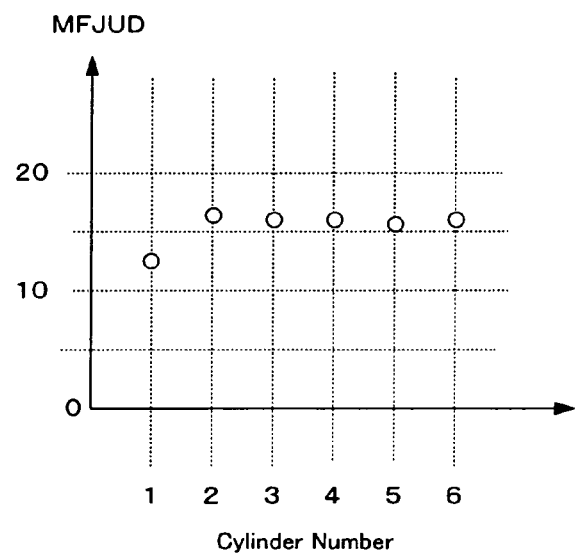

FIG. 9 shows values of the torque parameter MFJUD in a certain operating condition. (a) shows a state where there is almost no variation in the torque parameter between the cylinders. (b) shows a state where the torque parameter of the cylinder #1 (cylinder No. 1) has a relatively large deviation with respect to the other cylinders. The object of the present invention is to modify a state as shown in (b) to a state as shown in (a).

Figure 10:
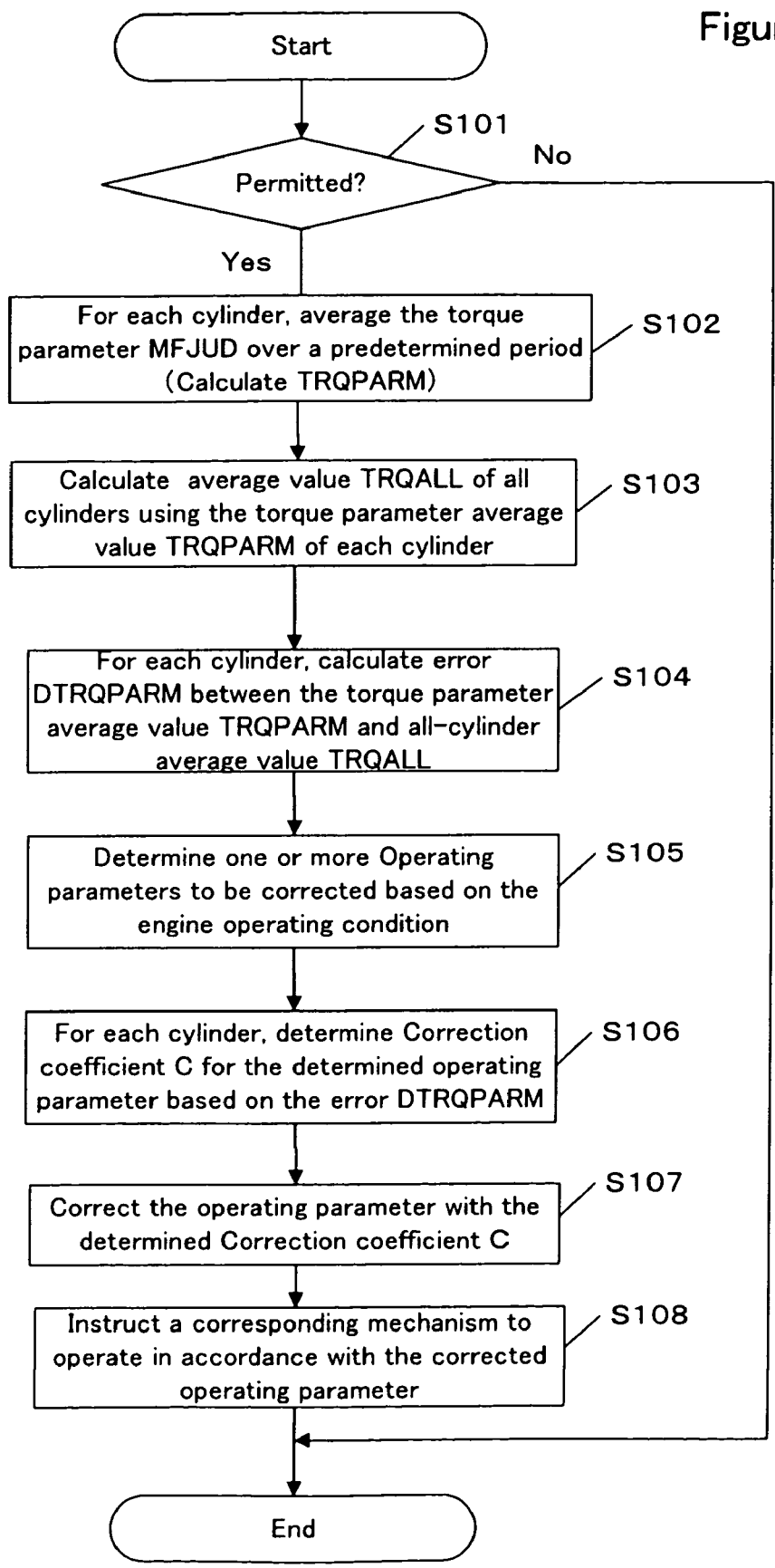
FIG. 10 is a flowchart of a process for suppressing output variations in accordance with one embodiment of the present invention.

FIG. 10 is a flowchart of a process that is executed by the CPU of the ECU, more specifically, executed by the permission determining part 31, the variation determining part 33, the output correcting part 34 and the output variation controlling part 35 of FIG. 2.

In step S101, it is determined whether or not the engine is in an idle operating state. If the engine is in the idle operating state, the process for suppressing the output variations is permitted to proceed to step S102.

In step S102, for each cylinder, the torque parameter MFJUD calculated by the process of FIG. 3 is averaged over a predetermined period in accordance with the equation (14). In the equation (14), k represents a cylinder discrimination number. As described above, the torque parameter MFJUD is a modified relative rotational speed OMGREFM integrated over one TDC period. A torque parameter per crank angle is calculated by averaging the torque parameters MFJUD over one TDC period (corresponding to 120 degrees of crank angle in this example). Because the torque parameter MFJUD represents a torque that is generated over one TDC period (120 degrees in this embodiment), the average value TRQPARM(k) of the torque parameter represents a torque generated per crank angle.

$$TRQPARM(k)=MDJUD(k)/\text{one TDC period} \quad (14)$$

In step S103, an average value TRQALL of all the cylinders is calculated by using the torque parameter average value TRQPARM(k) for each cylinder in accordance with the equation (15). In the equation (15), a number in each bracket represents the cylinder discrimination number. In this embodiment, the average value TRQALL of all the cylinders (referred to as an all-cylinder average value) is used as a reference value.

$$TRQALL=(TRQPARM(1)+TRQPARM(2)+TRQPARM(3)+TRQPARM(4)+TRQPARM(5)+TRQPARM(6))/6 \quad (15)$$

In step S104, for each cylinder, an error DTRQPARM between the all-cylinder average value TRQALL and the torque parameter average value TRQPARM of the cylinder is calculated in accordance with the equation (16).

$$DTRQPARM(k)=TRQPARM(k)-TRQALL \quad (16)$$

In step S105, a process for determining, based on the engine operating condition, which one or more of the operating parameters that are capable of changing the engine output torque are to be corrected is performed (this process will be described later referring to FIG. 13 through FIG. 15). In this embodiment, as described above, the fuel supply amount, the ignition timing and the intake air amount are used as an operating parameter and one or more of these operating parameters are determined as an operating parameter to be corrected.

The aim is to control the output of each cylinder so that the torque parameter average value TRQPARM of each cylinder is equal to the all-cylinder average value TRQALL. Therefore, in step S106, as to each of the one or more operating parameters that have been determined in step S105, a correction coefficient C (a "correction term" in the case of the ignition timing) used for eliminating the error DTRQPARM of each cylinder is calculated.

Referring to FIG. 11(a), an example of a fuel amount correction map is shown. Referring to FIG. 11(b), an example of a lift amount correction map is shown. Referring to FIG. 11(c), an ignition timing correction map is shown. These maps may be stored in the memory of the ECU 1.

In these map, if the error DTRQPARM is zero, the correction coefficient C is zero, so the correction is not performed. It is shown that the torque parameter average value of the cylinder becomes larger than the all-cylinder average value as the error DTRQPARM increases larger than zero. Therefore, the correction coefficient C smaller than zero is assigned so that the torque parameter average value of the cylinder is reduced to the all-cylinder average value. On the other hand, it is shown that the torque parameter average value of the cylinder becomes smaller than the all-cylinder average as the error DTRQPARM decreases smaller than zero. Therefore, the correction coefficient C larger than zero is assigned so that the torque parameter average value of the cylinder is increased up to the all-cylinder average value.

When the operating parameter to be corrected is the fuel supply amount, a map as shown in FIG. 11(a) is referred to based on the calculated error DTRQPARM to determine the correction coefficient C corresponding to the error. When the operating parameter to be corrected is the ignition timing, a map as shown in FIG. 11(b) is referred to based on the calculated error DTRQPARM to determine the correction term C corresponding to the error. When the operating parameter to be corrected is the lift amount, a map as shown in FIG. 11(c) is referred to based on the calculated error DTRQPARM to determine the correction coefficient C corresponding to the error.

A value of the operating parameter is determined based on the operating condition of the engine 2 by using an any appropriate method. For example, the current value of an operating parameter can be calculated by an appropriate control process that is performed at a predetermined time interval. In step S107, for each cylinder, such a current value thus determined of the operating parameter is corrected in accordance with the correction coefficient C that has been determined in step S106 for the cylinder. When the operating parameter is the fuel supply amount or the lift amount, the value of the operating parameter is corrected in accordance with the equation (17-1). When the operating parameter is the ignition timing, the value of the operating parameter is corrected in accordance with the equation (17-2). If the correction coefficient C is zero, the operating parameter value is not corrected. Thus, the operating parameter is corrected such that the output torque increases in proportion to an increase of the correction coefficient C.

$$\text{corrected operating parameter}=\text{value of operating parameter}\times(1+\text{correction coefficient } C) \quad (17\text{-}1)$$

$$\text{corrected operating parameter}=\text{value of operating parameter}+\text{correction term } C \quad (17\text{-}2)$$

In step S108, a corresponding mechanism is instructed to operate in accordance with the corrected operating parameter. For example, in the case where the operating parameter is the fuel supply amount, a control signal based on the corrected fuel supply amount calculated for each cylinder is sent to the fuel injection mechanism 21, which drives the fuel injection valve 18 of each cylinder in accordance with the received control signal. Thus, the corrected fuel supply amount calculated for a cylinder is supplied to the corresponding cylinder. A similar control is performed for the ignition timing and the lift amount.

Alternatively, calculating the average value of the torque parameter MFJUD over a predetermined period in step S102 may be implemented by another technique. For example, a weighting factor may be used for this smoothing operation. Further, a moving average may be performed for this smoothing operation.

In the above embodiment shown in FIG. 10, the error is calculated by comparing between each cylinder and all cylinders for the torque parameter per crank angle. Alternatively, the comparison between each cylinder and all cylinders may be performed for the torque parameter (integrated value) MFJUD. In this case, a process as shown in FIG. 12 is implemented.

Figure 12:
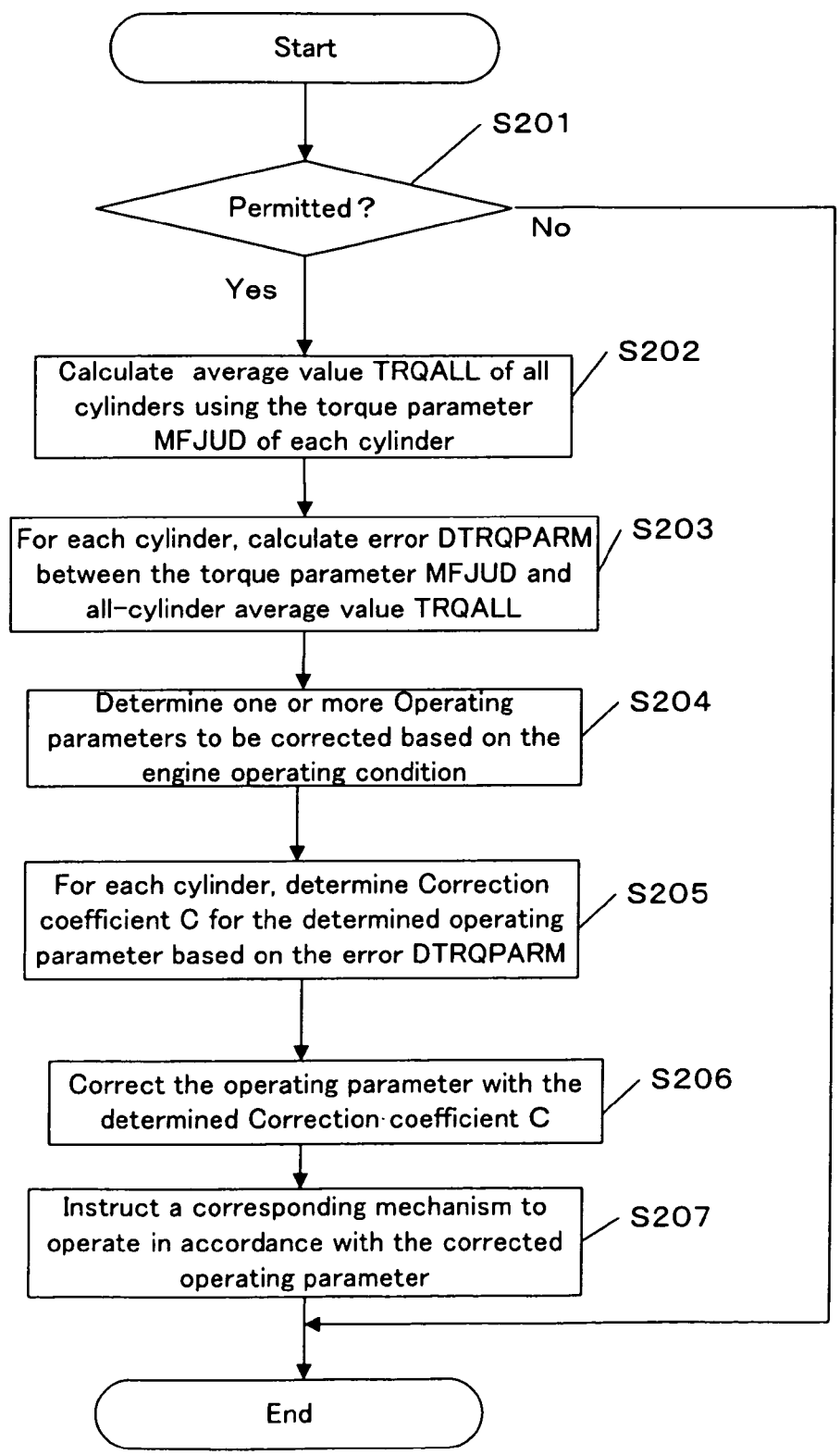
FIG. 12 is a flowchart of a process for suppressing output variations in accordance with another embodiment of the present invention.

Step S201 in FIG. 12 is the same as step S101 of FIG. 10. In step S202, an all-cylinder average value for the torque parameter MFJUD is calculated according to the equation (18). A number in each bracket indicates a cylinder discrimination number.

$$TRQALL=(MFJUD(1)+MFJUD(2)+MFJUD(3)+MFJUD(4)+MFJUD(5)+MFJUD(6))/6 \quad (18)$$

In step S203, for each cylinder, an error DTRQPARM between the all-cylinder average value TRQALL and the torque parameter MFJUD of the cylinder is calculated in accordance with the equation (19).

$$DTRQPARM(k)=MFJUD(k)-TRQALL \quad (19)$$

Figure 11:
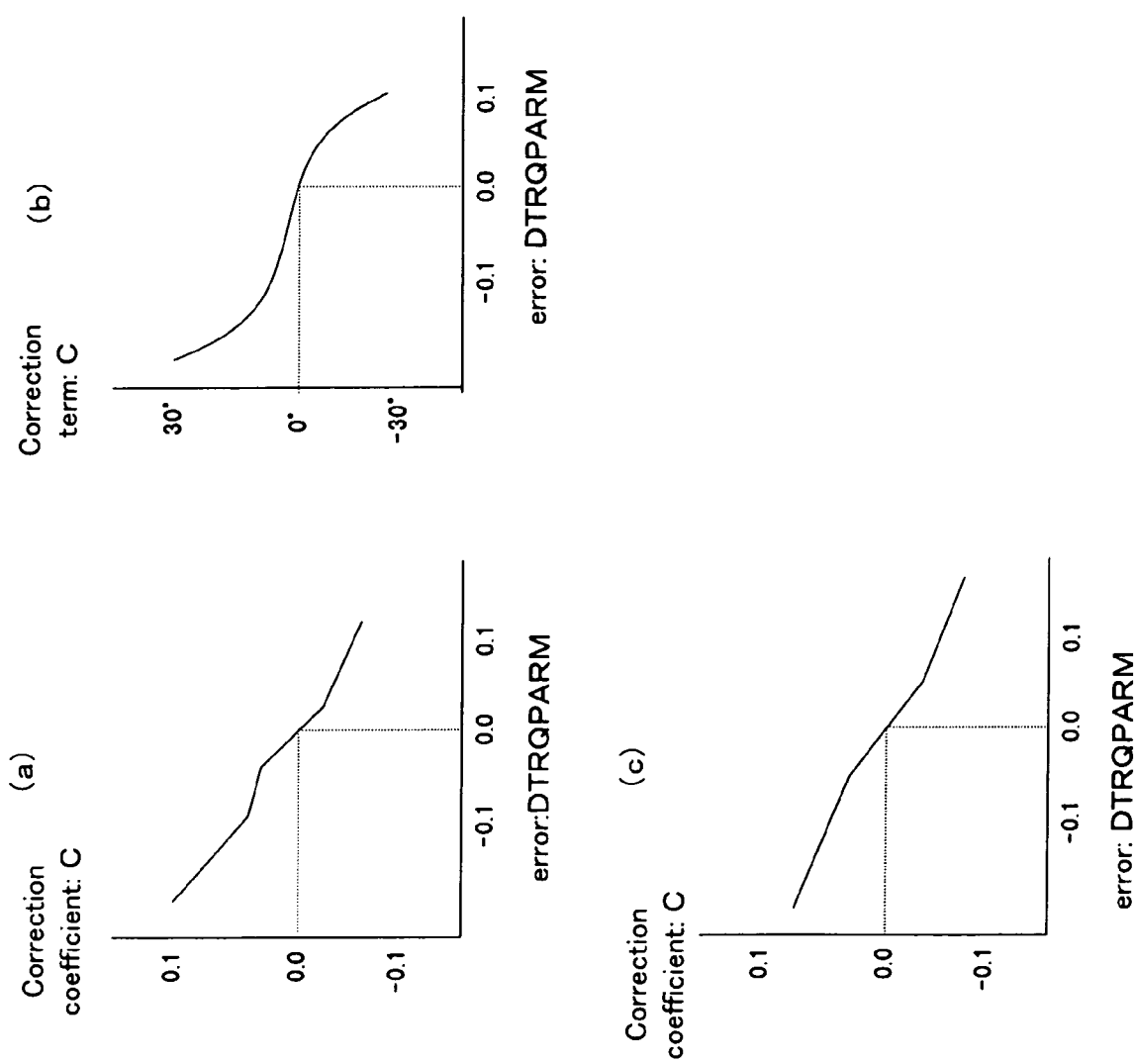
FIG. 11 shows a map used for determining a correction coefficient for correcting an output in accordance with one embodiment of the present invention.

Step S204 is the same as step S105 of FIG. 10. In step S205, for each of the one or more operating parameters determined in step S204, a correction coefficient C to be used for eliminating the error DTRQPARM is determined for each cylinder. The same maps as shown in FIG. 11 may be pre-stored in the memory of the ECU 1. The correction coefficient C is determined by referring to one or more of the maps based on the error. Step S206 and step S207 are the same as step S107 and step S108 of FIG. 10.

In the embodiments shown in FIG. 10 and FIG. 12, the correction coefficient C is determined based on the error between the all-cylinder average value and the torque parameter of each cylinder. Alternatively, a ratio between the all-cylinder average value and the torque parameter of each cylinder may be determined and then the correction coefficient may be determined based on the ratio.

Furthermore, prior to step S107 and step S206 in which the operating parameter is corrected by using the correction coefficient C, a step for determining whether to permit the actual correction may be provided. For example, consider the case where the lift amount is determined as an operating parameter to be corrected. If the engine operating condition abruptly changes (for example, the engine rotational speed becomes high) when the lift amount is actually changed according to the correction, the correction may not be desirably reflected. In such a situation, the correction of the lift amount can be prevented.

Figure 13:
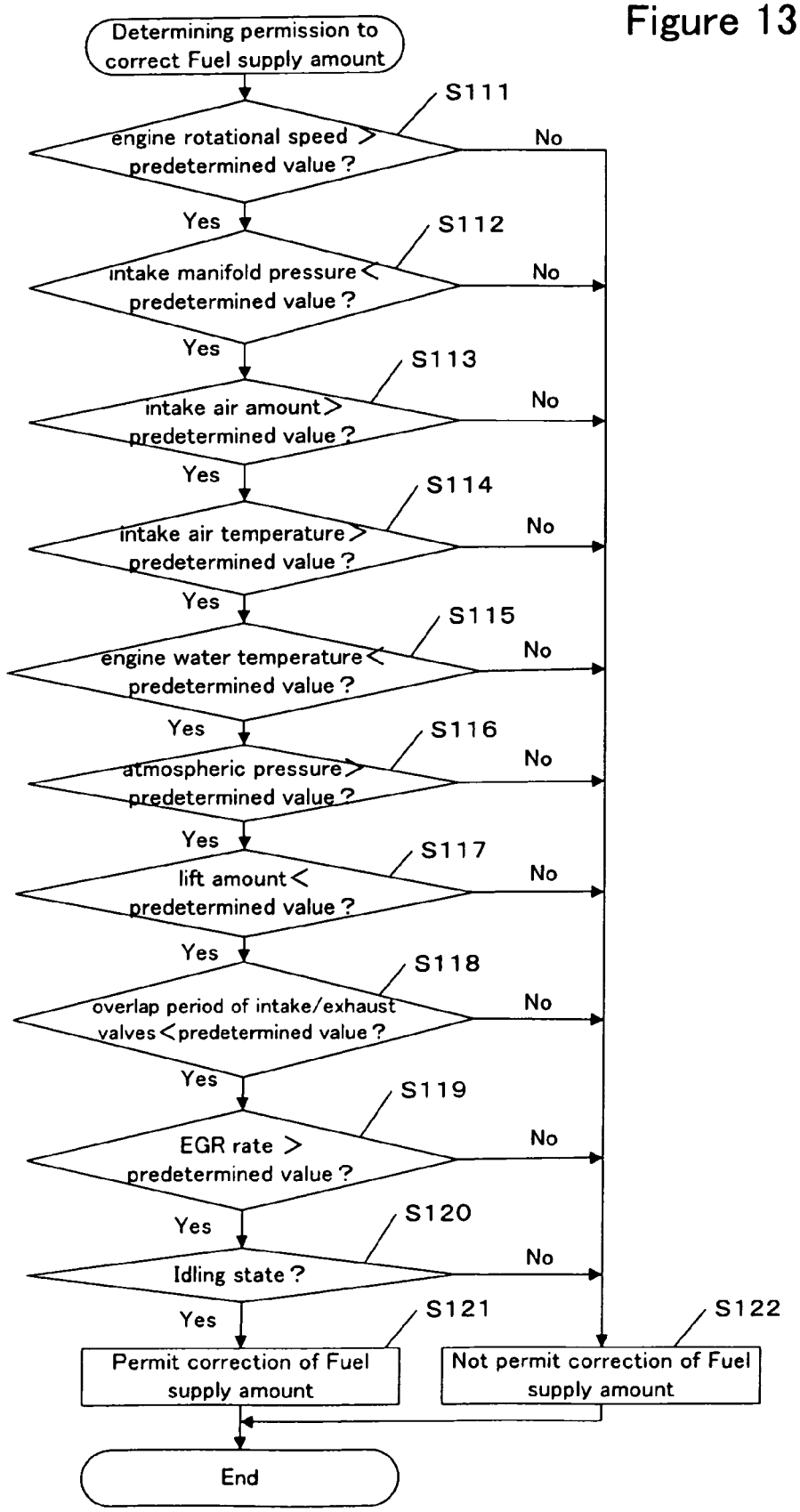
FIG. 13 is a flowchart of a process for determining whether a correction for a fuel amount is permitted in accordance with another embodiment of the present invention.
Figure 14:
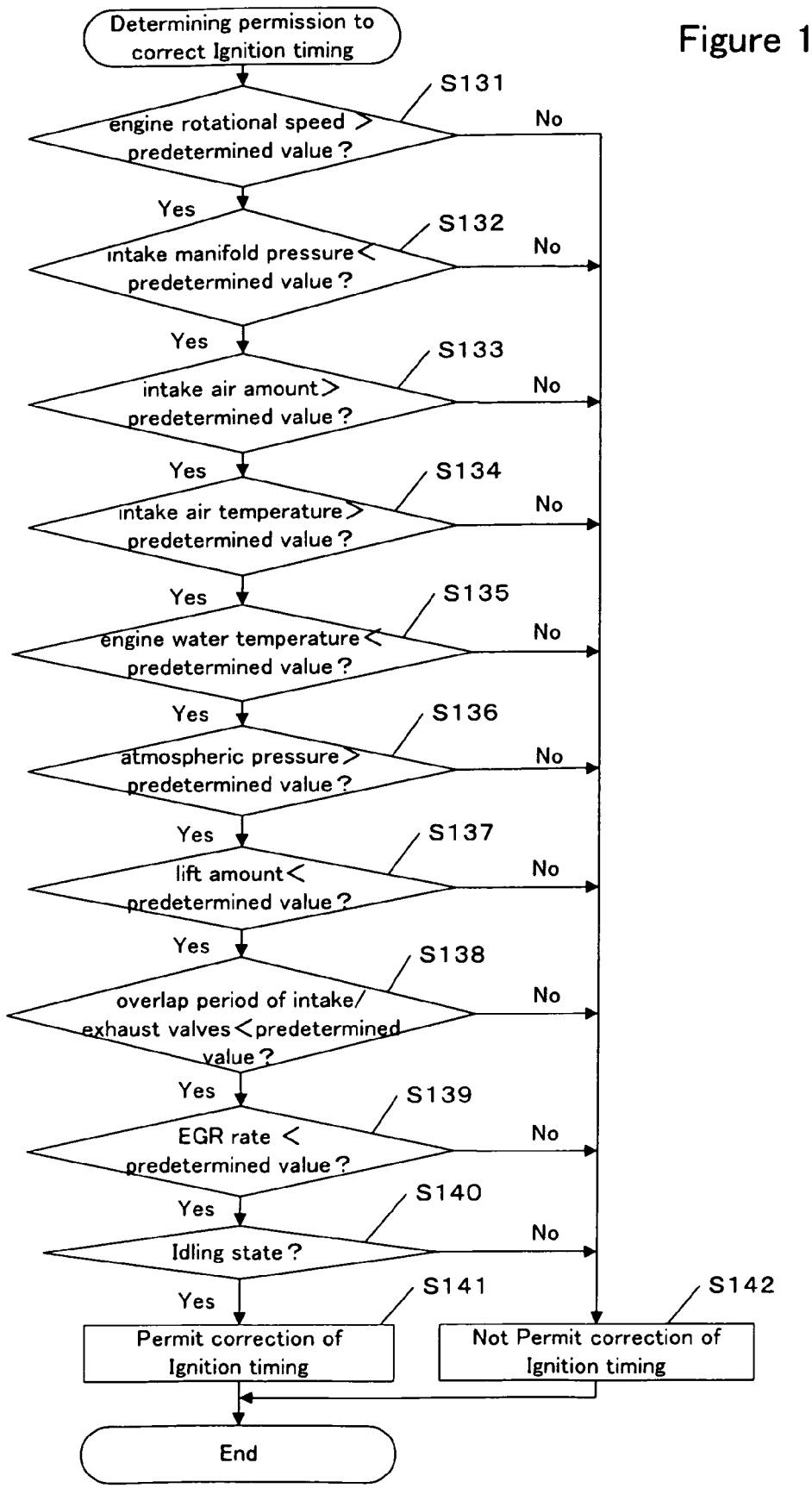
FIG. 14 is a flowchart of a process for determining whether a correction for an ignition timing is permitted in accordance with another embodiment of the present invention.
Figure 15:
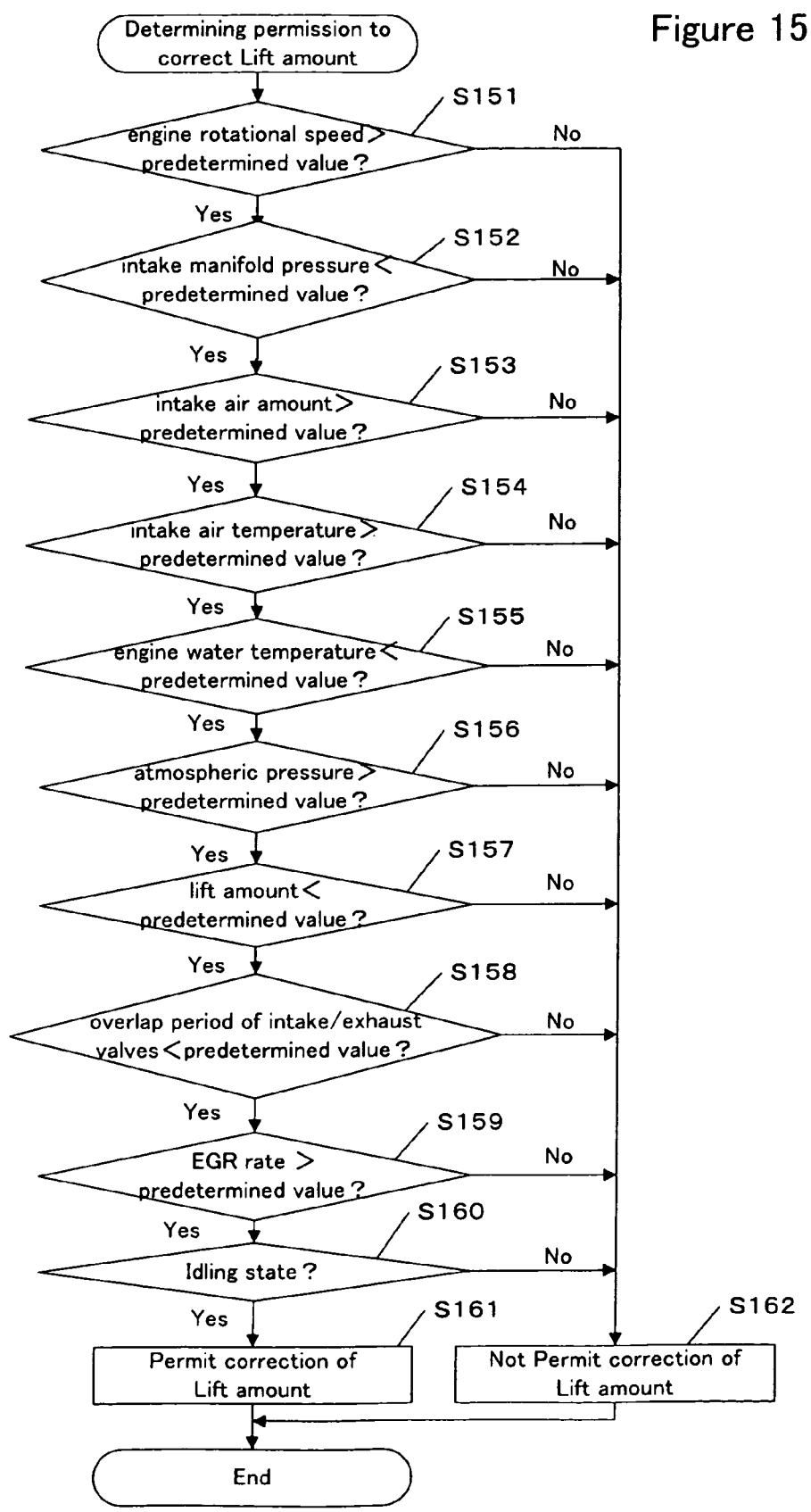
FIG. 15 is a flowchart of a process for determining whether a correction for a lift amount is permitted in accordance with another embodiment of the present invention.

FIG. 13 through FIG. 15 show processes for determining the operating parameter(s) to be corrected. These processes are performed in step S105 of FIG. 10 or in step S204 of FIG. 12. The processes of FIG. 13 through FIG. 15 can be performed in parallel.

FIG. 13 shows a process regarding the fuel supply amount. This process checks the operating condition of the engine 2 to determine whether or not the correction for the fuel supply amount is permitted.

In step S111, it is determined whether or not the engine rotational speed detected by the crank angle sensor 11 (FIG. 1) is higher than a predetermined value (for example, 2000 rpm). In step S112, it is determined whether or not the intake manifold pressure detected by the intake manifold pressure sensor 9 is less than a predetermined value (for example, 300 mmHg (about 40 kPa)). In step S113, it is determined whether or not the intake air amount detected by the air flow meter 7 is greater than a predetermined value (for example, 0.2 g). In step S114, it is determined whether or not the intake air temperature TA detected by the intake air temperature sensor 8 is greater than a predetermined value (for example, 70 degrees). In step S115, it is determined whether or not the engine water temperature TW detected by the engine water temperature sensor 10 is less than a predetermined value (for example, 100 degrees). In step S116, it is determined whether or not the atmospheric pressure PA detected by the atmospheric pressure sensor 12 is greater than a predetermined value (for example, 550 mmHg (about 73 kPa)).

In step S117, it is determined whether or not the lift amount of the intake valve detected by the lift amount sensor is less than a predetermined value (for example, 0.2 mm). In step S118, it is determined whether or not the overlap period of the intake/exhaust valves is less than a predetermined value (for example, 25 degrees of crank angle). In step S119, it is determined whether or not the EGR rate is greater than a predetermined value (for example, 20%). The EGR rate can be determined by "re-circulated exhaust gas amount/(re-circulated exhaust gas amount+fresh air amount)". The re-circulated exhaust gas amount can be determined based on the opening degree of the EGR valve 6 and the fresh air amount can be detected by the airflow meter 7. In step S120, it is determined whether or not the engine 2 is in an idle operating state.

If all of the decisions in step S111 through step S120 are Yes, the correction of the fuel supply amount is permitted (S121) and accordingly the fuel supply amount is determined as an operating parameter to be corrected. If one of the decisions in step S111 through step S120 is No, the correction of the fuel supply amount is not permitted (S122).

FIG. 14 shows a process for determining whether or not the correction of the ignition timing is permitted. Because all steps except for step S139 are the same as in FIG. 13, the description is omitted. In step S139, it is determined whether or not the EGR rate is less than a predetermined value (for example, 20%). Determination for the EGR rate in this step is different from the corresponding determination in the process regarding the fuel supply amount (FIG. 13) and determination in the process regarding the lift amount (which will be described below referring to FIG. 15). As the EGR rate is higher, the combustion time is longer by inert gas, which retards the ignition timing. As a result, the stability of the torque control using the ignition timing may degrade. Therefore, the correction for the ignition timing is permitted when the EGR rate is less than the predetermined value.

FIG. 15 shows a process for determining whether or not the correction for the lift amount is permitted. Because this process is substantially the same as in FIG. 13, the description is omitted.

Thus, among the operation parameters of the fuel supply amount, the ignition timing and the lift amount, one or more operation parameters permitted for the correction are determined based on the operating condition of the engine 2. Because one or more operating parameters to be corrected are determined based on the operating condition of the engine, it is prevented that the operating condition of the engine 2 becomes unstable due to the correction of the operating parameters.

The determination steps shown in FIGS. 13 through 15 are examples. Various alternative embodiments may be used. For example, all of these determination steps shown in the figures need not necessarily to be performed and another determination step may be added. Furthermore, not only the operating condition of the engine but also the engine characteristics (such as stoichiometric engine, lean-burn engine or the like) may be considered. Although the correction is permitted if all of the answers of the determination steps are Yes (AND condition) in this embodiment, the correction may be permitted if one or more answers are Yes or the other one or more answers are Yes (OR condition).

Now, an alternative embodiment for the manner for calculating the torque parameter performed by the torque parameter calculating part 32 of FIG. 2 will be described.

Figure 16:
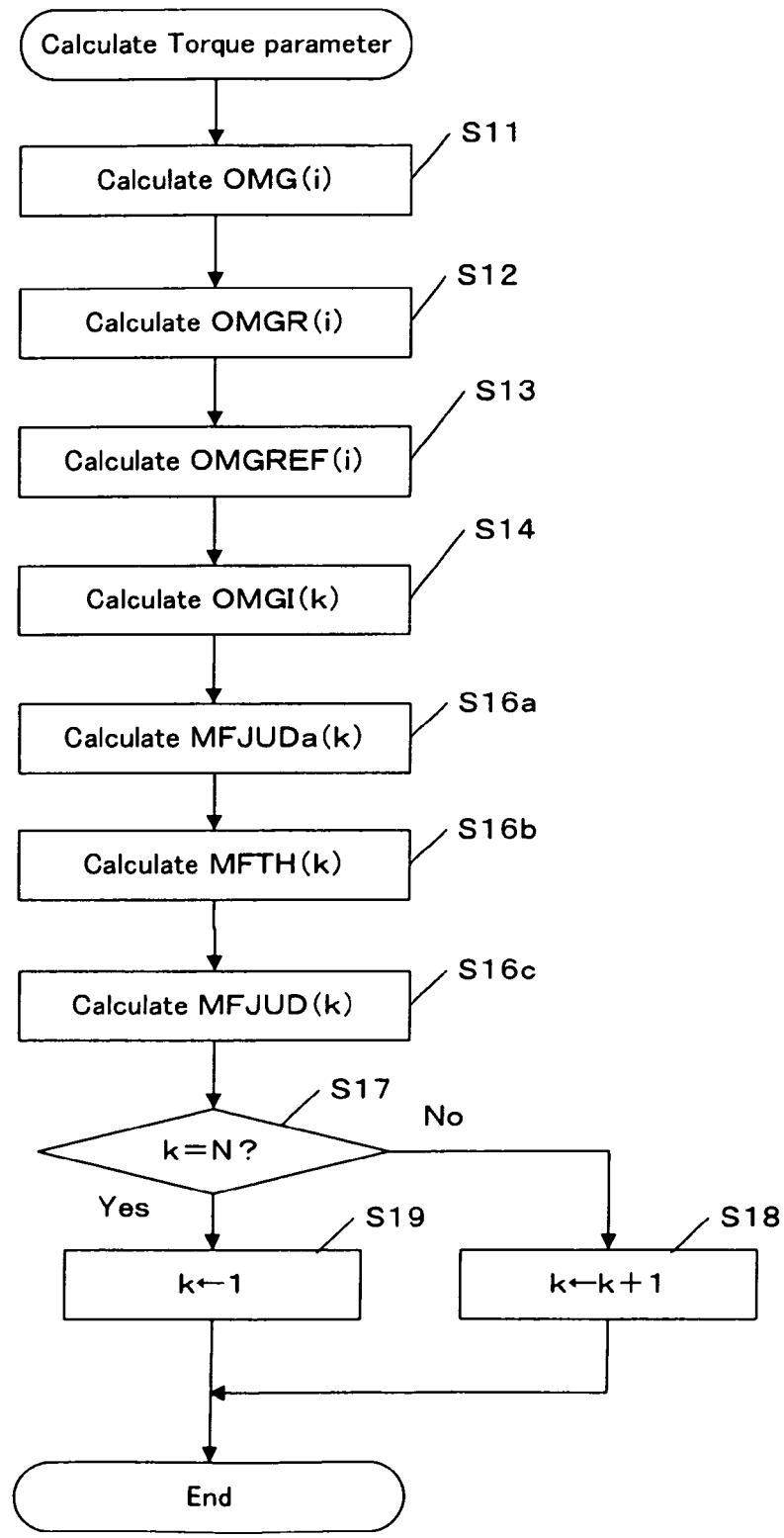
FIG. 16 is a flowchart of a process for calculating a torque parameter in accordance with a modification of the first embodiment of the present invention.

FIG. 16 shows a modification of the process shown in FIG. 3 (the first embodiment). The process shown in FIG. 16 is obtained by changing steps S15 and S16 shown in FIG. 3 to steps S16a, S16b and S16c.

In step S16a, a torque parameter MFJUDa(k) is calculated as an integrated value of the relative rotational speeds OMGRFF(i) according to the equation (20).

$$MFJUDa(k) = \sum_{i=(k-1)NTDC}^{kNTDC-1} OMGREF(i) \tag{20}$$

In step S16b, an integrated value MFTH(k) of the inertial force rotational speed OMGI is calculated according to the equation (21).

$$MFTH(k) = -NTDC \times OMGI(k) \tag{21}$$

In step S16c, a torque parameter MFJUD is calculated according to the equation (22).

$$MFJUD(k)=MFJUDa(k)-MFTH(k) \quad (22)$$

Thus, in this modified embodiment, the torque parameter MFJUD is calculated by using the integrated value of the relative rotational speed and the integrated value of the inertial force rotational speed, in place of the integrated value of the modified relative rotational speed.

Figure 17:
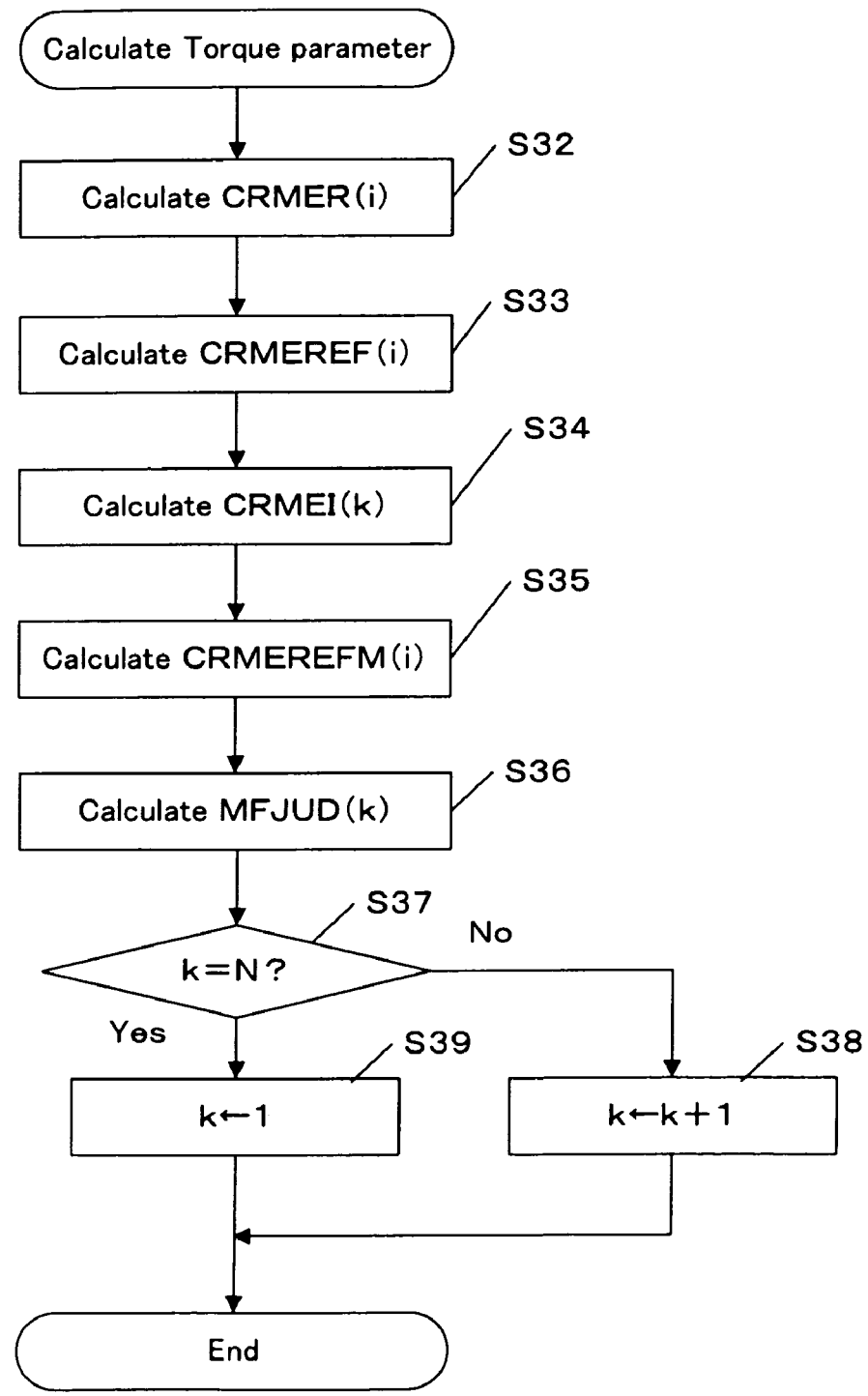
FIG. 17 is a flowchart of a process for calculating a torque parameter in accordance with a second embodiment of the present invention.

FIG. 17 shows a flowchart of a second embodiment of a process for calculating a torque parameter. In the first embodiment described above referring to FIG. 3 and FIG. 16, the time parameter CRME is converted into the rotational speed OMG. In this alternative embodiment, the time parameter CRME is used as a speed parameter. An integrated value of the relative time parameter CRMEREF, which is calculated in the following process, can be used as a parameter indicating a torque because it exhibits similar changes to the integrated value of the relative rotational speed OMGREF shown as an example in FIG. 5. The second embodiment is the same as the first embodiment except for the points described below.

In step S32, a 720-degree filtering process is performed in accordance with the equation (23) to calculate a filtered time parameter CRMER(i).

$$CRMER(i)=CRME(i)-(CRME(0)-CRME(ND))\times D\theta \times i/4\pi \quad (23)$$

In step S33, the relative time parameter CRMEREF(i) is calculated according to the equation (24). In the equation (24), CRMER((k−1)NTDC) is a reference time parameter which corresponds to the filtered time parameter at the compression TDC of the cylinder being subjected to the process.

$$CRMEREF(i)=CRMER((k-1)NTDC)-CRMER(i) \quad (24)$$

In step S34, an inertial force time parameter CRMEI(k) is calculated according to the equation (25).

$$CRMEI(k)=3I \cdot CRME((k-1)NTDC)/K \quad (25)$$

In step S35, a modified relative time parameter CRMEREFM(i) is calculated according to the equation (26).

$$CRMEREFM(i)=CRMEREF(i)-CRMEI(k) \quad (26)$$

In step S36, a torque parameter MFJUD(k) representing a torque is calculated by calculating an integrated value of the modified relative time parameter CRMEREFM in accordance with the equation (27).

$$MFJUD(k) = \sum_{i=(k-1)NTDC}^{kNTDC-1} CRMEREFM(i) \quad (27)$$

In step S37, it is determined whether or not the cylinder discrimination number k is equal to the number N of cylinders. If the answer of step S37 is No, the cylinder discrimination number k is incremented by 1 (S38). If the answer is Yes, the cylinder discrimination number k is returned to 1 (S39).

Variations in the output between cylinders can be controlled by using the torque parameter MFJUD thus calculated, according to the above-described process of FIG. 10 or FIG. 12.

Figure 18:
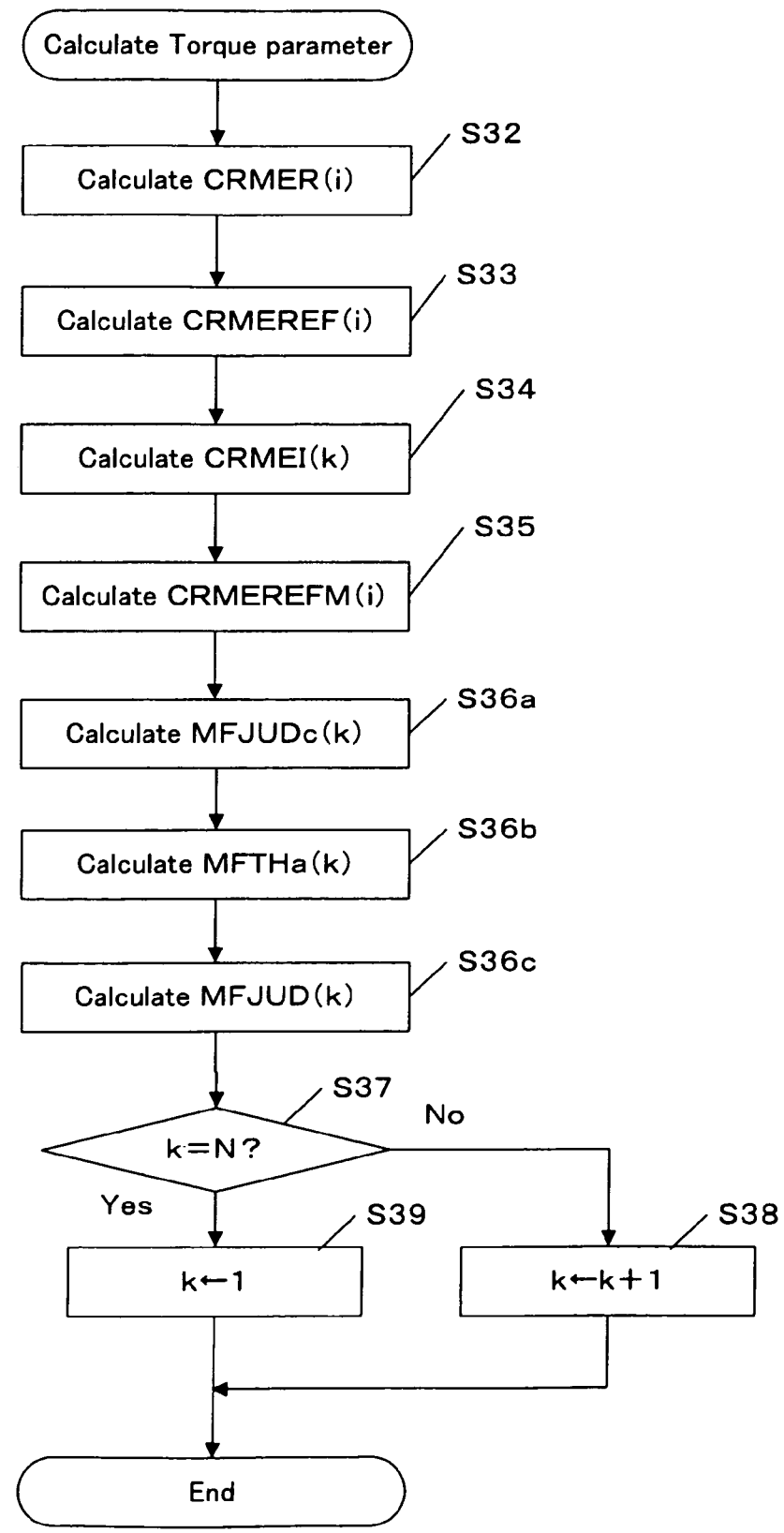
FIG. 18 is a flowchart of a process for calculating a torque parameter in accordance with a modification of the second embodiment of the present invention.

FIG. 18 shows a modification of the embodiment shown in FIG. 17. The modified embodiment is obtained by changing step S36 to steps S36a, S36b and S36c.

In step S36a, an integrated parameter MFJUDc(k) of the relative time parameter is calculated according to the equation (28).

$$MFJUDc(k) = \sum_{i=(k-1)NTDC}^{kNTDC-1} CRMEREF(i) \quad (28)$$

In step S36b, an integrated value MFTHa(k) of CRMEI is calculated in accordance with the equation (29).

$$MFTHa(k)=NTDC \times CRMEI(k) \quad (29)$$

In step S36c, a torque parameter MFJUD is calculated in accordance with the equation (30).

$$MFJUD(k)=MFJUDc-MFTHa(k) \quad (30)$$

In this modified embodiment, the torque parameter MFJUD is calculated by using the integrated value of the relative time parameter CRMEREF and the integrated value of the inertia force time parameter CRMEI, in place of integrating the modified relative time parameter CRMEREFM.

As to the calculation of the torque parameter, there are various modifications. In the above-described embodiment, the time period parameter CRMF(i) is applied to the equation (1) to calculate the rotational speed OMG. Alternatively, the rotational speed OMG may be calculated by using an integrated value CRME30(i) of five time parameter CRME calculated according to the equation (31), so as to prevent the calculation accuracy from degrading in a condition of a higher rotational speed.

$$CRME30(i) = \sum_{j=0}^{4} CRME(i+j) \quad (31)$$

In this case, the rotational speed OMG(i) is calculated in accordance with the equation (32). However, the calculation by the equation (32) includes a phase shift of the calculated rotational speed. Therefore, it is preferable to perform a phase correction corresponding to the phase shift.

$$OMG(i)=5D\theta/CRME30(i) \quad (32)$$

Further, in the above-described embodiment, the rotational speed and the time period parameter at the compression TDC are used as a reference rotational speed and a reference time parameter. However, the sampling timing of the reference speed parameter and the reference time parameter may be within a vicinity of the compression top dead center (for example, within a range of the compression TDC±7.5 degrees). The value of 7.5 degrees corresponds to a case where the sampling period of the rotational speed parameter is 15 degrees. In general, the rotational speed parameter sampled within a range of the compression TDC±θSPL/2 is preferably used, where θSPL represents a sampling period.

Furthermore, with respect to the 720-degrees filtering process, the equation (33) may be used instead of the equation (2). The equation (33) cancels the linearly changing components by using a moving average value OMGAVE(m) of the rotational speed OMG for the period of 720 degrees of the crank angle. In the equation (33), m represents a discrete time corresponding to the period of 720 degrees of the crank angle.

$$OMGR(i)=OMG(i)-(OMGAVE(m)-OMGAVE(m-1))\times D\theta \times i/4\pi \quad (33)$$

Next, a third embodiment of a manner for calculating a torque parameter performed by the torque parameter calculating part 32 of FIG. 2 will be described. In this embodiment, an influence of disturbances due to torsion of the crankshaft, a detection error of the time parameter CRME detected by the crank angle sensor and the like can be removed.

Figure 19:
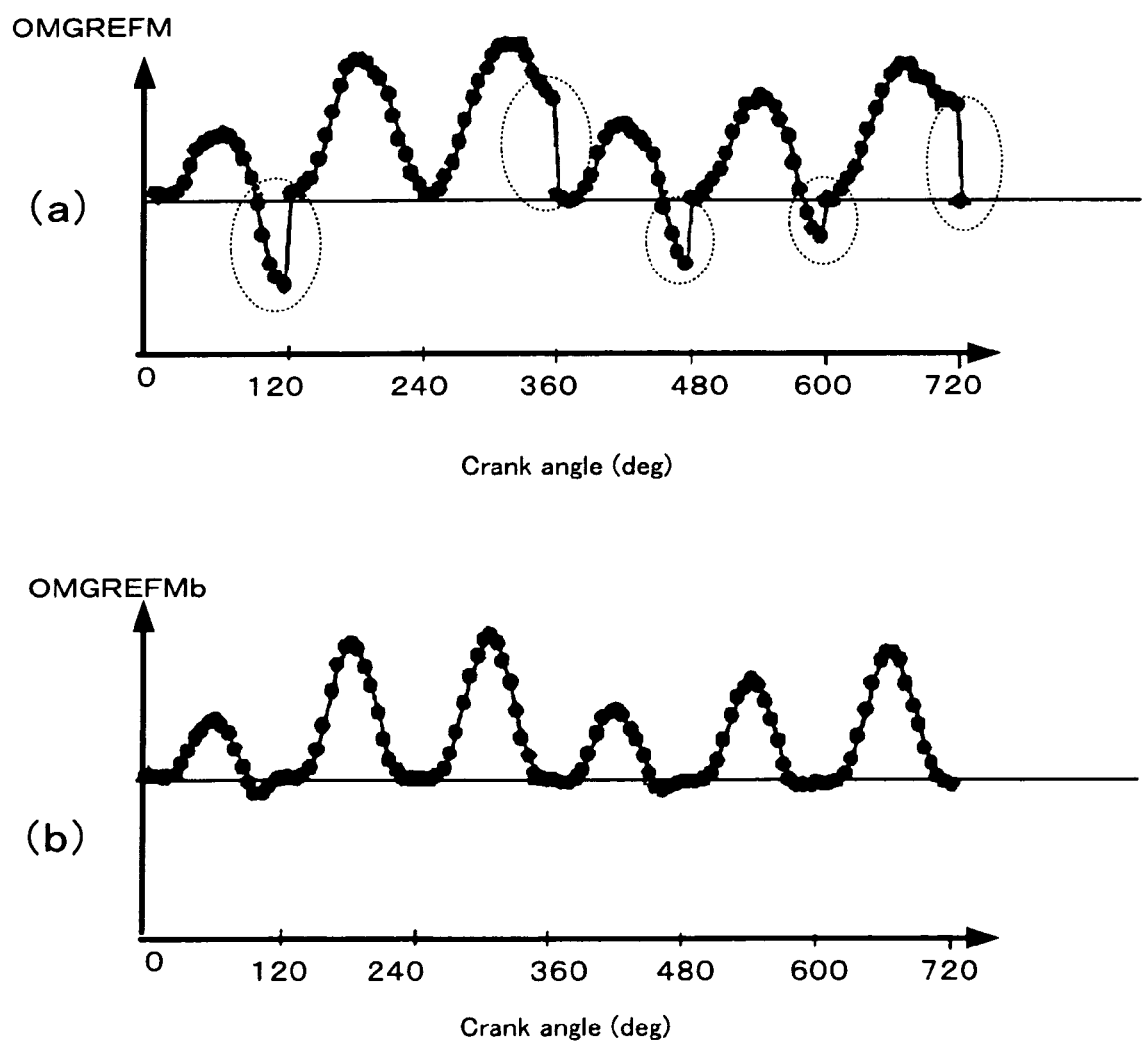
FIG. 19 schematically shows influence of disturbances contained in a crank angle sensor output.

FIG. 19(a) shows an example of an actually measured value of the modified relative rotational speed OMGREFM. In FIG. 19(a), the portions surrounded with the dashed lines indicate the influence by the above-described disturbances. If the influence of such disturbances is present, an error may occur in calculating the torque parameter.

Therefore, in this embodiment, the influence of the above-described disturbances is eliminated by multiplying the modified relative rotational speed OMGREFM by a combustion correlation function FCR that approximates changes in the rotational speed when normal combustion is performed and there is no disturbance that affects the detected value of the crank angle sensor. FIG. 19(b) shows a modified relative rotational speed OMGREFMb calculated by multiplying the modified relative rotational speed OMGREFM shown in FIG. 19(a) by the combustion correlation function FCR. It is seen that the disturbances are suppressed.

Figure 20:
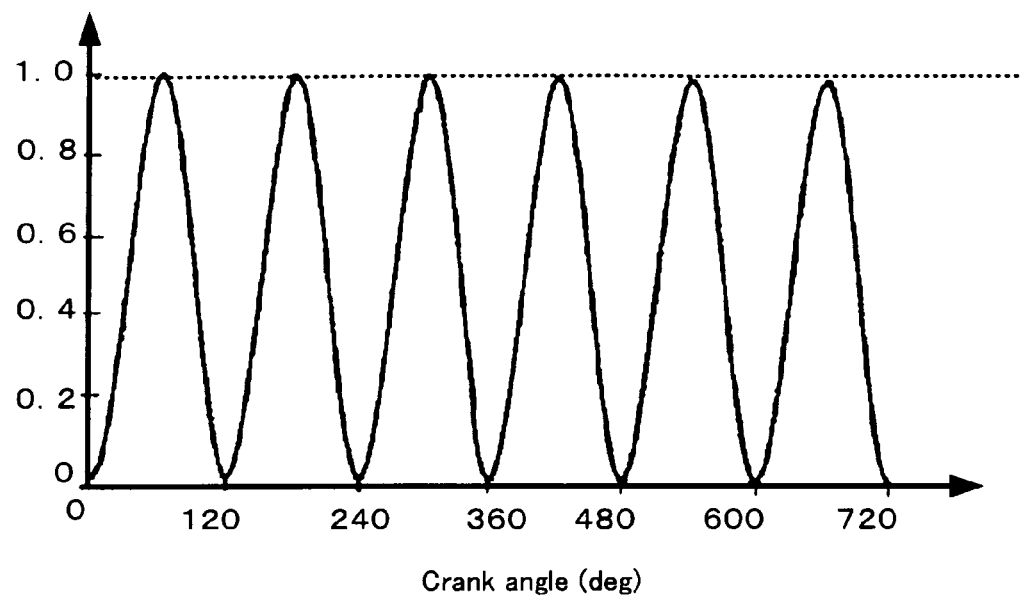
FIG. 20 shows an example of a combustion correlation function in accordance with one embodiment of the present invention.

FIG. 20 shows an example of the correlation function FCR, which is defined in accordance with the equation (34). In the equation (34), N represents the number of cylinders and $\theta$ represents a crank angle defined on the basis of a crank angle at which a piston in a specific cylinder of the engine is positioned at the TDC (refer to FIG. 7). In FIG. 20, the combustion correlation function FCR corresponding to a 6-cylinder engine is shown.

$$FCR = \{1 - 2\cos(N \cdot \theta/2)\}/2 \tag{34}$$

Figure 21:
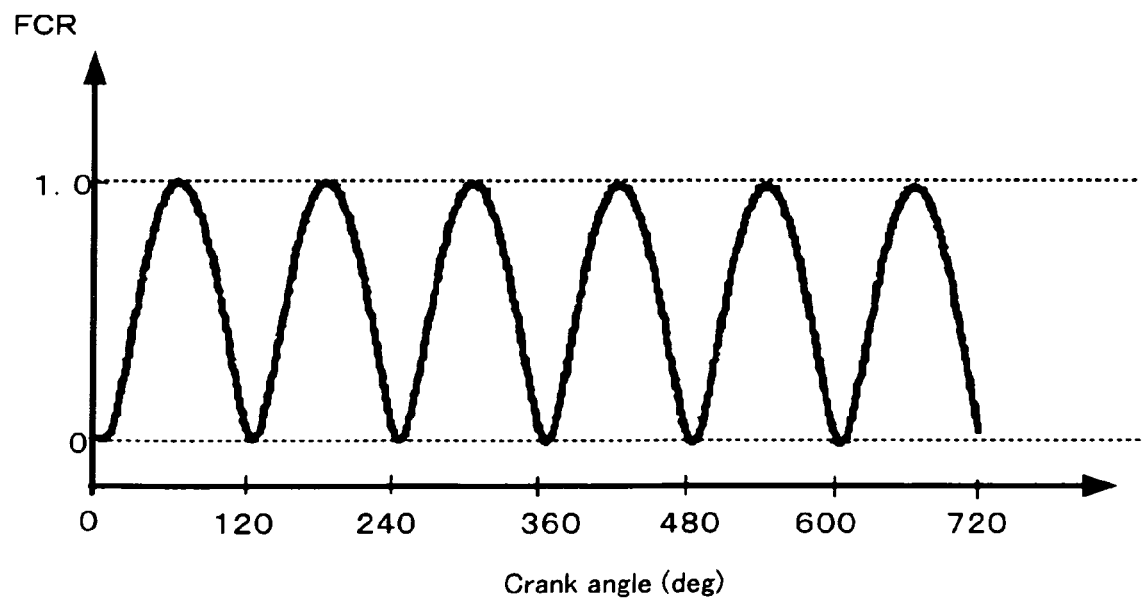
FIG. 21 shows another example of a combustion correlation function in accordance with one embodiment of the present invention.

The combustion correlation function FCR may be obtained by, when the engine is operating in a steady state, for example after warming-up, and normal combustion is performed, measuring an in-cylinder pressure of each cylinder, summing up the measured in-cylinder pressure for all the cylinders to calculate combined changes in the in-cylinder pressure and then converting the combined changes in the in-cylinder pressure into changes in the rotational speed of the engine. FIG. 21 shows the combustion correlation function FCR thus calculated. This combustion correlation function FCR is obtained by normalizing a waveform indicating the changes in the rotational speed of the engine in a normal combustion state such that the minimum value of the waveform is equal to 0 and the maximum value of the waveform is equal to 1.

Figure 22:
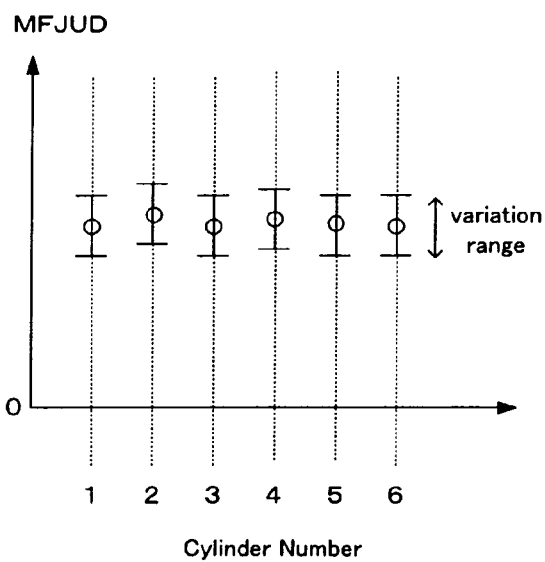
FIG. 22 shows variations in the measured value of a torque parameter in accordance with one embodiment of the present invention.
Figure 22:
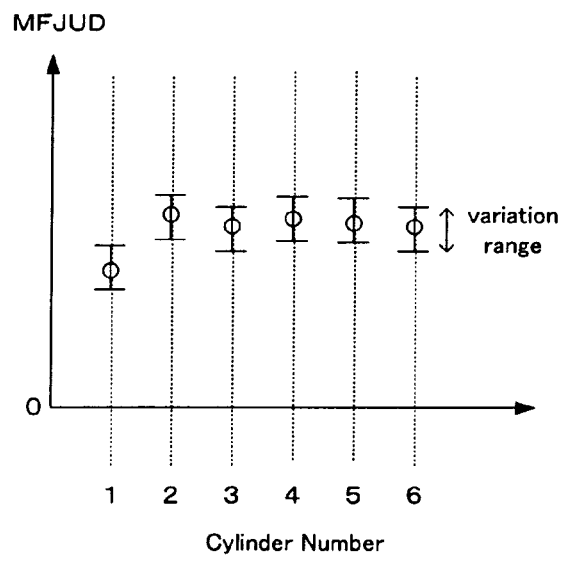

FIG. 22(a) shows an example of variation ranges in the torque parameter MFJUD when the relative rotational speed is not corrected by the combustion correlation function FCR. FIG. 22(b) shows an example of variation ranges in the torque parameter MFJUD in this third embodiment. As clearly seen from these figures, by performing the correction using the combustion correlation function FCR, the calculation accuracy of the torque parameter is improved and the variation range can be narrowed (narrowed by about 40% in the illustrated example).

Figure 23:
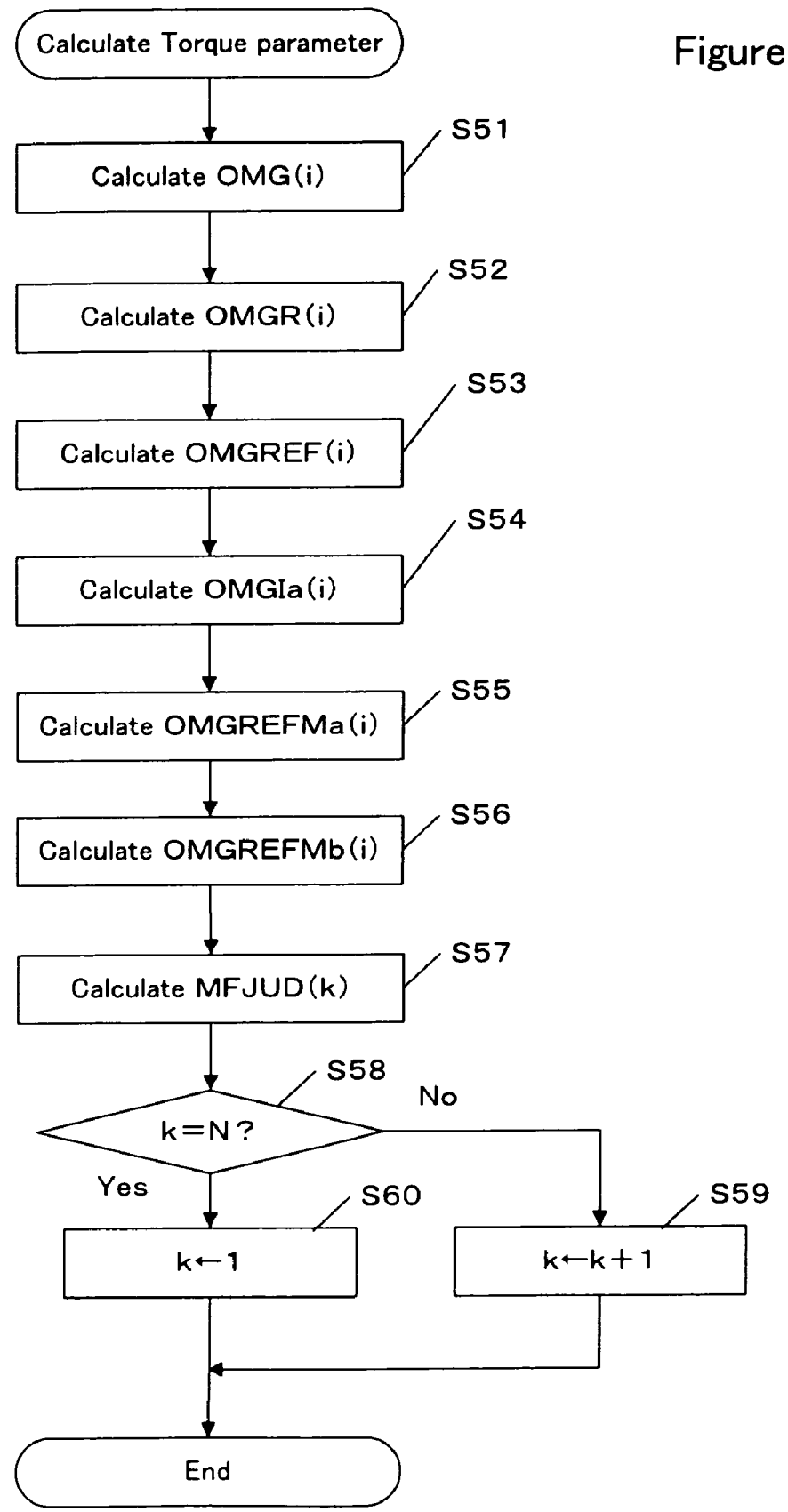
FIG. 23 is a flowchart of a process for calculating a torque parameter in accordance with a third embodiment of the present invention.

FIG. 23 shows a flowchart of a process for calculating a torque parameter in accordance with the third embodiment.

Because steps S51 through S53 are the same as steps S11 through S13 of FIG. 3, the description for these steps will be omitted below.

In step S54, the inertial force rotational speed OMGI(k) calculated in accordance with the equation (4) is applied to the equation (35) to calculate an inertial force rotational speed OMGIa(i). In the first embodiment, the modified relative rotational speed OMGREFM(i) is calculated by directly applying the inertial force rotational speed OMGI(k) at the compression TDC to the equation (5). In this embodiment, the inertial force rotational speed OMGIa(i) at each sample timing is calculated and then the relative rotational speed OMGREF is modified with the inertial force rotational speed OMGIa(i).

$$OMGIa(i) = OMGI(k) \times \{\cos(N \cdot D\theta \cdot i/2) - 1\} \tag{35}$$

In step S55, the inertial force rotational speed OMGIa(i) calculated in step S54 is applied to the equation (36) to calculate a first modified relative rotational speed OMGREFMa(i).

$$OMGREFMa(i) = OMGREF(i) - OMGIa(i) \tag{36}$$

In step S56, the first modified relative rotational speed MGREFMa(i) calculated in step S55 and the correlation function FCR(i) calculated according to the equation (37) are applied to the equation (38) to calculate a second modified relative rotational speed OMGREFMb(i). The equation (37) is obtained by replacing $\theta$ in the equation (34) with (D$\theta \cdot$i).

$$FCR(i) = \{1 - 2\cos(N \cdot D\theta \cdot i/2)\}/2 \tag{37}$$

$$OMGREFMb(i) = OMGREFMa(i) \times FCR(i) \tag{38}$$

In step S57, the torque parameter MFJUD is calculated according to the equation (39).

$$MFJUD(k) = \sum_{i=(k-1)NTDC}^{kNTDC-1} OMGREFMb(i) \tag{39}$$

Thus, by using the combustion correlation function, the torque parameter can be calculated while removing the influence of disturbances that may affect the detection value of the crank angle sensor. Furthermore, by using the combustion correlation function shown in the equation (37), experiments for setting a table for calculating a value of the combustion correlation function become unnecessary and the correction of the torque parameter can be performed with a relatively simple calculation.

Alternatively, when the combustion correlation function based on the actually measured data shown in FIG. 21 is used, an FCR table, which is retrieved according to the parameter "i" for determining values corresponding to one period of the function FCR shown in FIG. 21, is previously stored in the memory, and the FCR table is retrieved in step S56 instead of performing the calculation of the equation (37). By using the combustion correlation function based on the actually measured data, the calculation of the torque parameter can be corrected such that the characteristics of the engine are reflected in the combustion correlation function.

Furthermore, instead of performing the calculation of the equation (38), a cosine function table may be previously stored in the memory and the combustion correlation function value FCR(i) may be calculated by retrieving that cosine function table. The correction using the FCR can be applied to the second embodiment in a similar way.

Now, a control technique, in accordance with one embodiment of the present invention, for determining variations in the fuel system and the intake air system between cylinders by using the above-described control apparatus 30 for suppressing the output variations (referred to as the output variation suppressing apparatus 30 shown in FIG. 2) will be described.

A fuel control apparatus for controlling the fuel amount to be supplied into each cylinder has been proposed so as to smooth the air/fuel ratios of cylinders. However, even if the fuel control is carried out such that the air/fuel ratio for all the cylinders is smoothed by the fuel control apparatus, the air/fuel ratio may deviate due to variations in the intake air amount. Depending on the magnitude of the deviation of the air/fuel ratio, a fuel correction amount may be excessive, which may lead to an erroneous determination that an abnormality has occurred in the fuel system through the fuel control apparatus.

Therefore, it is desirable to determine, for each cylinder, whether or not the intake air amount deviates and whether or not the fuel amount deviates. Through such determination, it can be determined whether the fuel correction amount that is calculated for each cylinder by the fuel control apparatus is appropriate. The intake air amount can be corrected more appropriately for each cylinder such that the intake air amounts of all the cylinders are smoothed. Furthermore, it can be determined, for each cylinder, whether there is an abnormality in the fuel system or in the intake air system.

Figure 24:
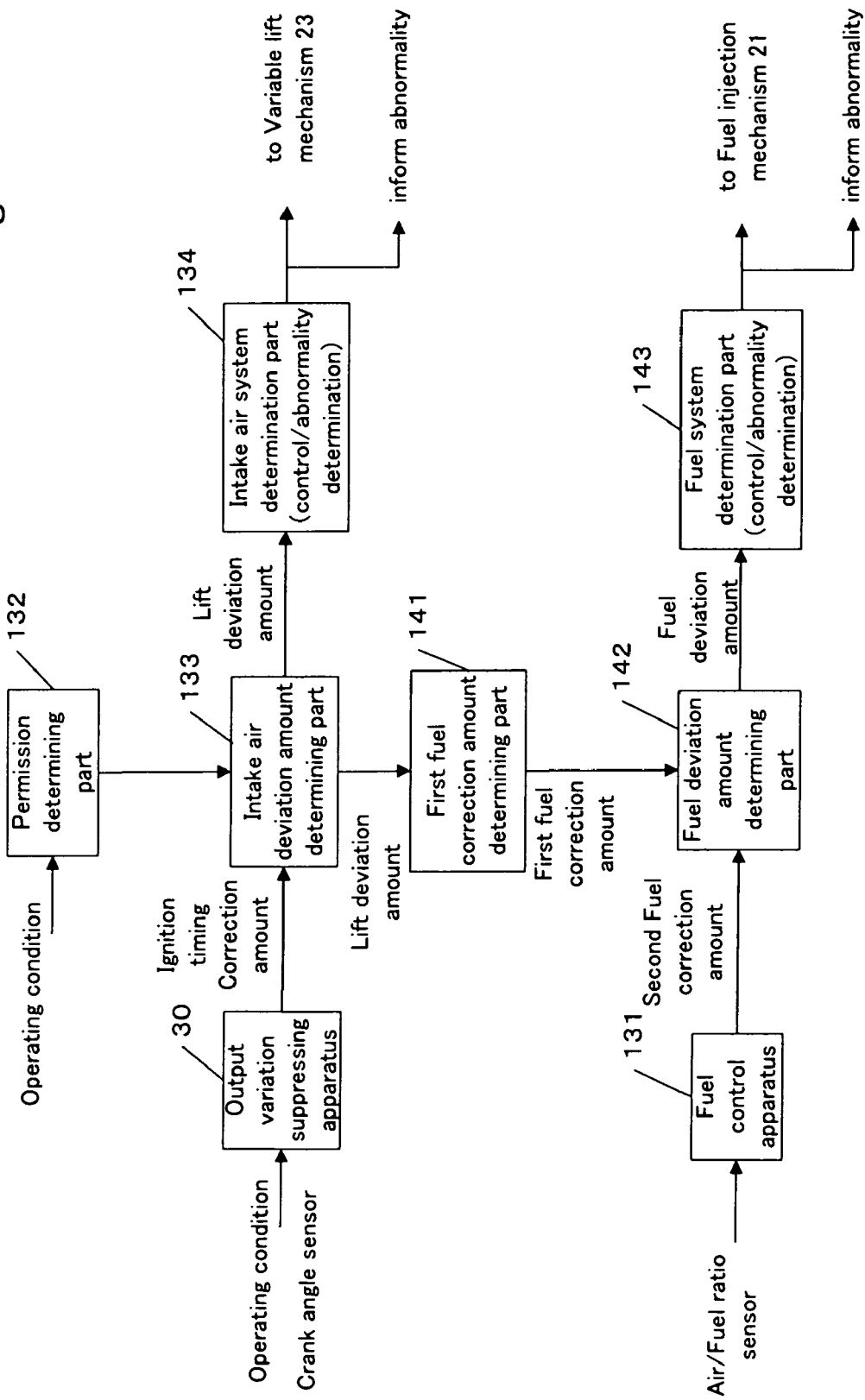
FIG. 24 shows a functional block diagram of a control apparatus comprising an output variation suppressing apparatus and a fuel control apparatus in accordance with one embodiment of the present invention.

In this embodiment, as shown in FIG. 24, a control apparatus is proposed that is capable of making a determination as described above for an engine comprising a fuel control apparatus 131 that performs a fuel control for each cylinder such that the air/fuel ratio is smoothed to a predetermined air/fuel ratio (stoichiometric ratio in this embodiment) for all the cylinders in addition to the output variation suppressing apparatus 30 (FIG. 2).

The engine in this embodiment has the same structure as the engine described above referring to FIG. 1. The output variation suppressing apparatus 30 has the same structure as in FIG. 2. In this example, the output variation suppressing apparatus selects the ignition timing as an operating parameter to be corrected for suppressing variations in the output between the cylinders and determines a correction amount (correction term C in FIG. 11(b) and the equation (17-2)) for the ignition timing. The ignition timing is controlled by the output variation controlling part 35 (FIG. 2) in accordance with the correction amount.

On the other hand, the fuel control apparatus 131 determines a correction amount for the fuel injection amount (a second fuel correction amount) to be used for smoothing the air/fuel ratios of all the cylinders. In this embodiment, the fuel control apparatus. 131 determines the second fuel correction amount for each cylinder such that the air/fuel ratios of all the cylinders are maintained at a predetermined air/fuel ratio (the stoichiometric air/fuel ratio in this embodiment).

A permission determining part 132 determines whether or not execution of a process for determining deviations of the intake air amount and the fuel amount is permitted. In this embodiment, the execution of the process is permitted if the engine is in an idle operating state. This is because more stable determination can be made when the engine output is low and stable.

An intake air deviation amount determining part 133 determines, for each cylinder, a deviation amount of the intake air amount based on the ignition timing correction amount received from the output variation suppressing apparatus 30. More specifically, the intake air deviation amount determining part 133 determines, in accordance with the ignition timing correction amount of each cylinder, how much the current lift amount of the intake valve of the cylinder controlled by the variable lift mechanism 23 (FIG. 1) deviates from a desired lift amount (such deviation will be hereinafter referred to as a "lift deviation amount"). Here, the desired lift amount is a desired value in the case where there is no variation in the intake air amount between the cylinders. In this embodiment, the desired lift amount is a value predetermined depending on the operating condition of the engine and is common to all of the cylinders. For example, it is set to a predetermined value used for an idle operating state.

As described above, because the ignition timing correction amount of each cylinder represents a deviation of the output of each cylinder, the ignition timing correction amount has a correlation with the lift deviation amount when the air/fuel ratio is constant. Therefore, in this embodiment, a correlation between the ignition timing correction amount and the lift deviation amount is generated in advance under the condition where all cylinders are maintained at a predetermined air/fuel ratio (which is a target of the smoothing operation by the fuel control apparatus 131 and is the stoichiometric air-fuel ratio in this embodiment). For each cylinder, the intake air deviation amount determining part 133 refers to the correlation based on the ignition timing correction amount received from the output variation suppressing apparatus 30 to determine the lift deviation amount of the cylinder.

For each cylinder, if the lift deviation amount is less than a first predetermined value, an intake air system determination part 134 maintains the current desired lift amount because the lift deviation has almost no influence on the smoothing operation of the output torque between the cylinders. For each cylinder, if the lift deviation amount is greater than a second predetermined value (>the first predetermined value), the intake air system determination part 134 determines that an abnormality such as a failure or the like exists in the intake air system of the cylinder (the intake system being a system for introducing air into the cylinder, and including the variable lift mechanism 23, the intake valve 16 and so on). In the case where the presence of an abnormality is determined, a driver can be informed by any appropriate means such as a warning light or the like.

For each cylinder, if the lift deviation amount is between the first and second predetermined values, the intake air system determination part 134 performs a control for removing the lift deviation amount. More specifically, the intake air system determination part 134 increases the desired lift amount. This increase is performed so as to make a ratio of the current lift deviation amount with respect to the desired lift amount smaller. If the ratio of the lift deviation amount becomes small, the lift deviation amount can be regarded as a negligible error from the viewpoint of smoothing the output torque for the cylinders. In addition, the intake air system determination part 134 decreases a desired gauge pressure with the increase of the desired lift amount so as to maintain the desired intake air amount to be introduced into the engine. The intake system determination part 134 generates a control signal in accordance with the increased desired lift amount to send it to the variable lift mechanism 23 and also generates a control signal in accordance with the decreased desired gauge pressure to send it to a throttle mechanism (not illustrated in the drawings) that drives the throttle valve 27. Then, the variable lift mechanism 23 controls the lift amount of the intake valve of all the cylinders so that the actual lift amount reaches the desired lift amount and the throttle mechanism controls the opening degree of the throttle valve 27 so that the actual gauge pressure reaches the desired gauge pressure. Thus, the deviation of the intake amount of each cylinder can be dissolved by making the lift deviation amount of each cylinder substantially negligible.

For each cylinder, a first fuel correction amount determining part 141 determines a first fuel correction amount based on the lift deviation amount determined by the intake air deviation amount determining part 133.

When the fuel amount for smoothing the air/fuel ratio to a predetermined value is being supplied to each cylinder, the lift deviation amount of each cylinder has a correlation with the fuel correction amount of the cylinder. Therefore, in this embodiment, a correlation between the lift deviation amount and the fuel correction amount (the first fuel correction amount) is generated in advance under the condition where all the cylinders are being supplied with the fuel amount required for maintaining all the cylinders at a predetermined air/fuel ratio (which is a target of the smoothing operation by the fuel control apparatus 131 and is the stoichiometric air-fuel ratio in this embodiment). For each cylinder, the first fuel correction amount determining part 141 refers to the correlation based on the lift deviation amount received from the intake air deviation amount determining part 133 to determine the first fuel correction amount of the cylinder.

For each cylinder, a fuel deviation amount determining part 142 calculates a difference, as a fuel deviation amount, between the second fuel correction amount that is output from the fuel control apparatus 131 and the above-described first fuel correction amount. As described above, the first fuel correction amount indicates a fuel amount to be corrected for the lift deviation amount when no deviation of the fuel amount exists between the cylinders (in other words, when the fuel amount is being supplied to each cylinder so that the air/fuel ratios for all the cylinders are smoothed to the predetermined value). Therefore, if the deviation is dissolved through the control by the fuel control apparatus 131, the second fuel correction amount should be almost equal to the first fuel correction amount. The fact that the difference between the first and second fuel correction amounts is greater indicates a possibility that an abnormality such as failure or the like exists in the fuel system of the cylinder (the fuel system being a system for supplying fuel to the cylinder, and including the fuel injection mechanism 21, the fuel injection valve 18 and so on). Accordingly, a fuel system determination part 143 determines that there is an abnormality in the fuel system if the difference between the first and second fuel correction amounts is greater than a predetermined value. In the case where the presence of an abnormality is determined, a driver can be informed by any appropriate means such as a warning light or the like.

If it is not determined that there is an abnormality, the fuel system determination part 143 drives the fuel injection mechanism in accordance with the second fuel correction amount calculated by the fuel control apparatus 131. If it is determined that there is an abnormality, the fuel injection mechanism may be driven in accordance with the first fuel correction amount while informing the driver of the abnormality.

Thus, each of the intake air deviation amount and the fuel deviation amount can be identified for each cylinder based on the ignition timing correction amount calculated by the output variation suppressing apparatus 30. Furthermore, based on the magnitudes of those deviations, it can be identified which cylinder has an abnormality in its intake air system and/or in its fuel system. By such identification of the failure location, actions such as identifying a failure cause, repair, replacement or the like for a component included in these systems can be more easily taken.

Figure 25:
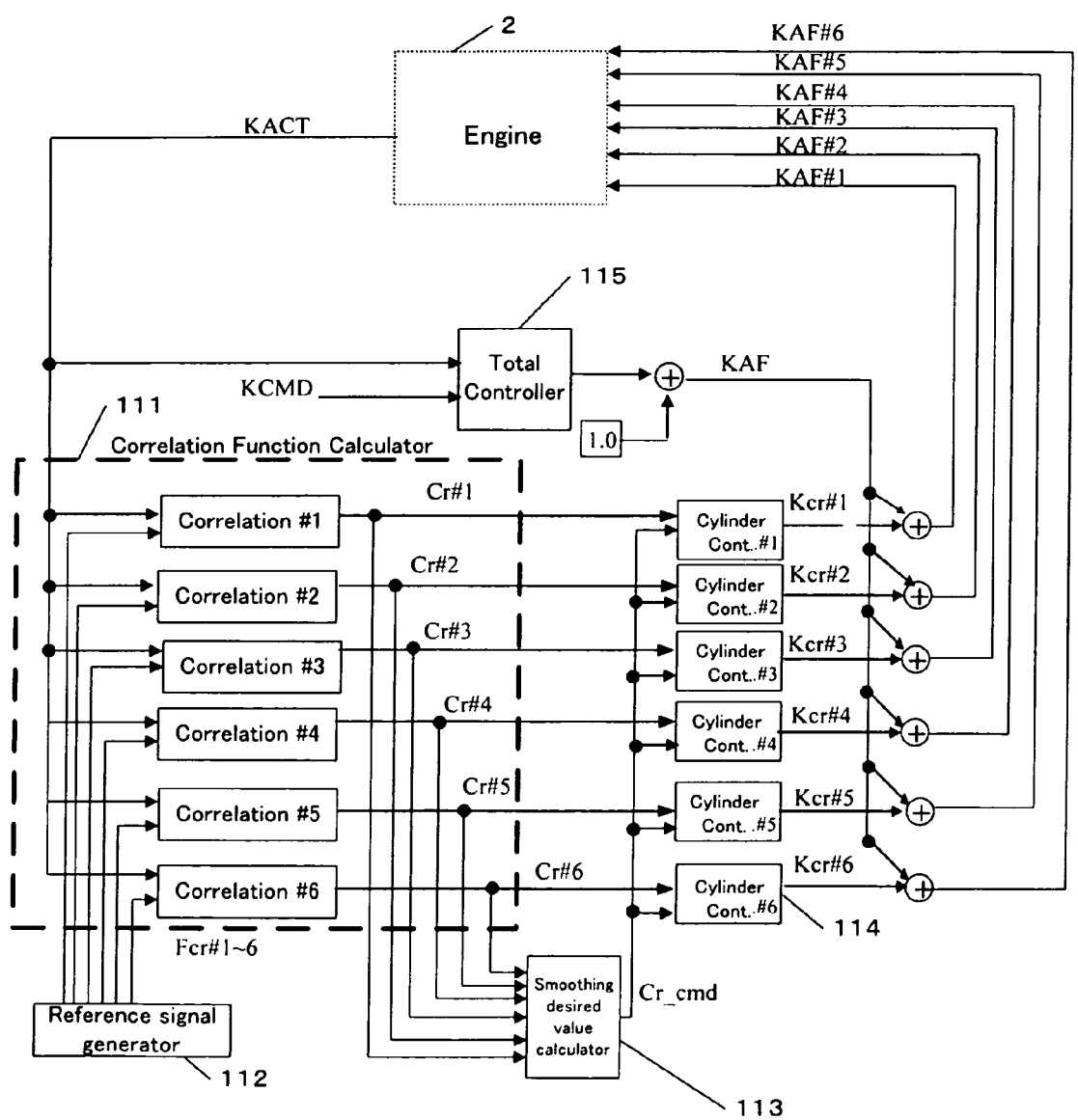
FIG. 25 is a block diagram of a fuel control apparatus in accordance with one embodiment of the present invention.

The fuel control apparatus 131 may be configured by any appropriate means. FIG. 25 shows an exemplary structure of the fuel control apparatus 131, which will be simply described. Details are disclosed in Japanese Patent Application Publication No. 2006-161577.

An output KACT corresponding to the air/fuel ratio of exhaust gas is measured by the LAF sensor 13 (FIG. 1). On the other hand, a reference signal generator 112 generates, in synchronization with the crank signal CRK, reference signals Fcr #1 to #6 which are modeled after discharge behavior of exhaust gas of each cylinder.

In accordance with the equation (40), a correlation function calculator 111 calculates a correlation function Cr in a finite range of the LAF sensor output KACT and the reference signal Fcr.

$$Cr\#i(k) = \frac{1}{N} \sum_{j=k-N+1}^{k} Fcr\#i(j) \cdot KACT(j) \quad (40)$$

Here, i represents a cylinder number (i=1 to 6 in the case of a 6-cylinder engine) and N represents the number of CRK signal pulses in one combustion cycle. In the case where one CRK signal pulse is issued every 30 degrees of the crank angle, N is 24. k represents time step.

Figure 26:
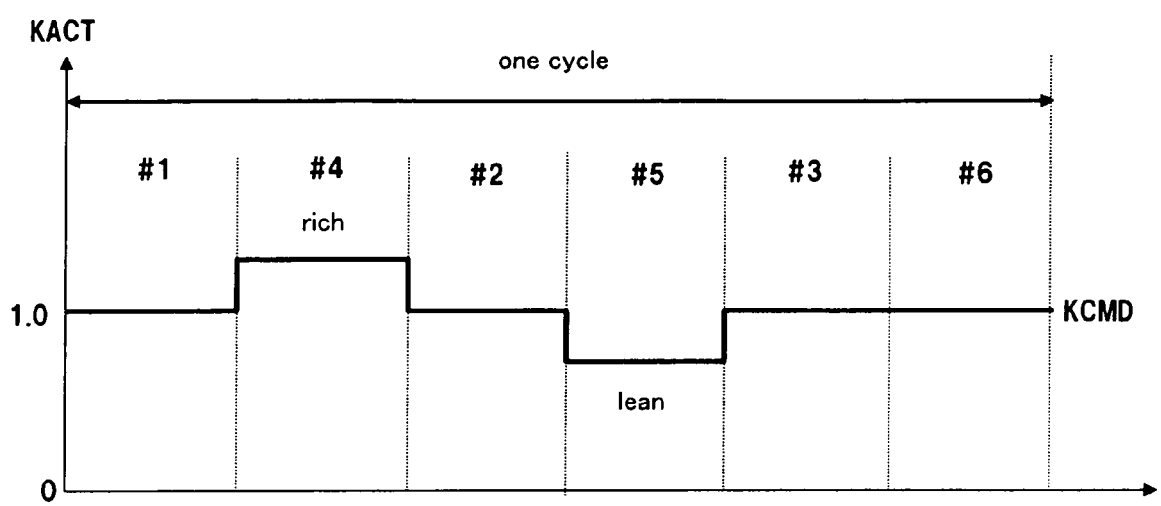
FIG. 26 schematically shows an output KACT of a LAF sensor in accordance with one embodiment of the present invention.
Figure 27:
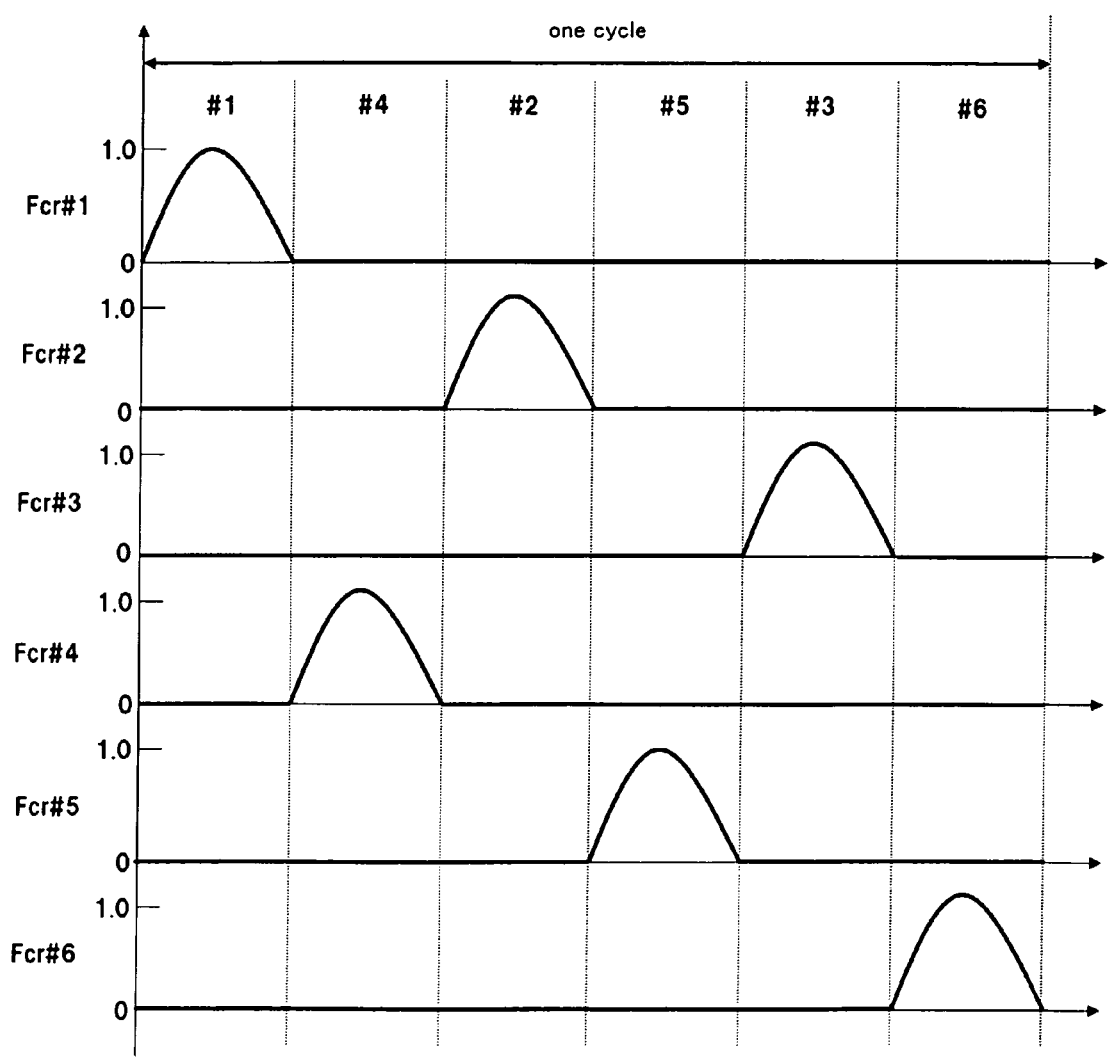
FIG. 27 schematically shows reference signals used in a fuel control apparatus in accordance with one embodiment of the present invention.

Now, referring to FIG. 26 and FIG. 27, the LAF sensor output KACT and the reference signal Fcr#i will be described. FIG. 26 is a schematic diagram of the LAF sensor output KACT. In FIG. 26, the KACT and the desired air/fuel ratio KCMD are shown in terms of the equivalent ratio. For the stoichiometric air/fuel ratio (theoretical air/fuel ratio, which is 14.7), the equivalent ratio takes a value of 1. If the air/fuel ratio is richer than the stoichiometric air/fuel ratio, the equivalent ratio takes a value greater than 1. If the air/fuel ratio is leaner than the stoichiometric air/fuel ratio, the equivalent ratio takes a value less than 1. In FIG. 26, the LAF sensor output KACT shows a rich state in the cylinder #4 and a lean state in the cylinder #5. Because the exhausting timing is determined depending on the fuel injection timing of each cylinder, the LAF sensor output KACT exhibits a periodic variation when the cylinder is in rich or lean state.

The reference signal Fcr#i is generated taking such characteristics of the LAF sensor output KACT into account. FIG. 27 is a schematic diagram of the reference signal Fcr#i. The reference signal Fcr#i is generated for each cylinder to reflect the behavior of exhaust gas from the cylinder in one combustion cycle. The reference signal of each cylinder has a sine waveform in the exhaust stroke of the subject cylinder. By using such reference signals, the correlation function Cr#i becomes greater as the air/fuel ratio of the corresponding cylinder i becomes richer, and becomes smaller as the air/fuel ratio of the corresponding cylinder i becomes leaner. For example, considering the correlation function with the LAF sensor output KACT shown in FIG. 26, the correlation function Cr#4 with the reference signal Fcr#4 of the cylinder #4 takes a maximum value, and the correlation function Cr#5 with the reference signal Fcr#5 of the cylinder #5 takes a minimum value.

Here, the reference signal Fcr is a periodic signal in which one combustion cycle of the engine is one period. In general, the cross-correlation of the periodic signal is characterized in that if the cross-correlation of the periodic signal is calculated in a finite section other than integral multiple of the period of the periodic signal, the cross-correlation exhibits a periodic behavior, and if the cross-correlation is calculated in a finite range of the integral multiple of the period of the periodic signal, the cross-correlation exhibits a constant value. To prevent resonance of the control system, it is preferable that an internal variable in the control system does not include periodic behavior. Therefore, the integral interval is set to the same as the period of the reference signal so that the correlation function Cr#i does not include periodic behavior.

A smoothing desired value calculator 113 calculates a smoothing desired value Cr_cmd to be used for smoothing the air/fuel ratios of the cylinders. Considering a relationship between the correlation function Cr#i and the air/fuel ratio of each cylinder, the fact that the air/fuel ratios of all of the cylinders match each other indicates that the correlation functions Cr#i of all of the cylinders match each other. Therefore, in this embodiment, the smoothing desired value Cr_cmd for causing the correlation function Cr#i of each cylinder to converge is defined as an average (mean value) of the correlation functions of all the cylinders as shown in the equation (41). In the equation (41), m represents the number of the cylinders (m=6 in this embodiment).

$$Cr\_cmd(k) = \frac{1}{m} \sum_{i=1}^{m} Cr\#i(k) \tag{41}$$

A cylinder controller 114 determines a smoothing coefficient Kcr#i for each cylinder for adjusting the fuel injection amount injected to the cylinder so that the correlation function Cr#i of the cylinder converges to the smoothing desired value Cr_cmd. In order to generate the smoothing coefficient of each cylinder, a 2-degree-of-freedom response assignment control, which will be described below in detail, is used. An advantage of using this control technique is that, when the smoothing desired value Cr_cmd abruptly varies or when the correlation function Cr#i largely deviates from the smoothing desired value, variations in the air/fuel ratio between the cylinders can be stably corrected and deterioration of emission and drivability can be prevented without generating overshoot and vibration behavior. However, another control technique (for example, a PID control or the like) may be alternatively used.

The cylinder controller 14 uses a desired value response assignment parameter Rcr to perform a low-pass filtering on the smoothing desired value Cr_cmd as shown in the equation (42). With this process, the waveform of the desired value varying in a step manner is smoothed, and is converted into a curve that gradually converges to the desired value.

$$Cr\_cmd\_f(k)=-Rcr \cdot Cr\_cmd\_f(k-1)+(1+Rcr)Cr\_cmd(k) \tag{42}$$

Here, Cr_cmd_f represents a desired value after the filtering process and k represents time step. The response assignment parameter is preferably set to satisfy $-1<Rcr<0$.

As shown in the equation (42), a trajectory of the filtered desired value Cr_cmd_f is defined by the response assignment parameter Rcr. Depending on what trajectory is defined for the desired value, a tracking speed of the correlation function Cr #i to the desired value Cr_cmd can be designated. The cylinder controller 114 calculates the smoothing coefficient Kcr#i of each cylinder so that the correlation function Cr#i converges to the desired value Cr_cmd_f thus determined.

In order to calculate the smoothing coefficient, an error Ecr#i between the correlation function Cr#i and the desired value Cr_cmd_f is calculated as shown in the equation (43).

$$Ecr\#i(k)=Cr\#i(k)-Cr\_cmd\_f(k) \tag{43}$$

A switching function (σcr#i is defined as shown in the equation (44). The switching function σcr#i defines converging behavior of the error Ecr#i. Scr represents a disturbance-suppressing response assignment parameter, which defines a converging speed of the error Ecr#i when disturbances exist. The disturbance-suppressing response assignment parameter Scr is preferably set to satisfy $-1<Scr<0$.

$$\sigma cr\#i(k)=Ecr\#i(k)+Scr \cdot Ecr\#i(k-1) \tag{44}$$

The smoothing coefficient Kcr#i for each cylinder is calculated as shown in the equation (45). In the equation (45), Krch_cr and Kadp_cr are feedback gains. The first term of the right side of the equation (45) is a proportional term and the second term is an integral term. Therefore, the equation (45) is equivalent to calculating a feedback amount in PI control with an input of the switching function σcr#i.

$$Kcr\#i(k) = -\text{Krch\_cr} \cdot \sigma cr\#i(k) - \text{Kadp\_cr} \cdot \sum_{j=0}^{k} \sigma cr\#i(j) \tag{45}$$

The calculated smoothing coefficient Kcr#i for each cylinder is a correction input for causing the correlation function Cr#i to converge to the smoothing desired value Cr_cmd. This coefficient Kcr#i is not a controlled variable for controlling the LAF sensor output KACT to the desired air/fuel ratio KCMD. The smoothing coefficient Kcr#i for each cylinder may generate a steady-state error between the LAF sensor output KACT and the desired air/fuel ratio KCMD except when the smoothing desired value Cr_cmd matches the desired air/fuel ratio KCMD.

For this reason, it is desirable to provide a total controller 115 for causing the LAF sensor output KACT to converge to the desired air/fuel ratio KCMD in addition to the cylinder controller 114. The algorithm of the total controller 115 can be implemented with a PID control, an adaptive control, an optimal control or the like. In this embodiment, the 2-degree-of-freedom response assignment control is used to implement the total controller 115 in a similar way to the cylinder controller 114.

A steady-state error can be promptly and precisely compensated for by setting a desired value response assignment parameter and a response assignment parameter for suppressing disturbances for the total controller 115 to be faster than those of the cylinder controller 114.

The total controller 115 uses the desired value response assignment parameter R to perform a low-pass filtering on the desired air/fuel ratio KCMD as shown in the equation (46). With this process, the desired value waveform that varies in a step manner is smoothed and converted into a curve that gradually converges to the desired value.

$$KCMD\_f(k)=-R \cdot KCMD\_f(k-1)+(1+R)KCMD(k) \tag{46}$$

Here, KCMD_f represents a desired value after the filtering process and k represents time step. The response assignment parameter is preferably set to satisfy $-1<Rcr<R<0$ so as to increase the response speed higher than that of the cylinder controller 14.

An error E between the LAF sensor output KACT and the desired value KCMD_f is calculated as shown in the equation (47).

$$E(k)=KACT(k)-KCMD\_f(k) \tag{47}$$

A switching function σ is defined as shown in the equation (48). S represents a disturbance-suppressing response assignment parameter, which defines a converging speed of the error E when disturbances exist. The disturbance-suppressing response assignment parameter S is preferably set to satisfy $-1<Scr<S<0$ so as to increase the response speed higher than that of the cylinder controller 14.

$$\sigma(k)=E(k)+S \cdot E(k-1) \tag{48}$$

Then, as shown in the equation (49), an air/fuel ratio correction coefficient KAF is calculated. In the equation (49), Krch and Kadp represent feedback gains.

$$KAF(k) = 1 - Krch \cdot \sigma(k) - Kadp \cdot \sum_{j=0}^{k} \sigma(j) \quad (49)$$

In the equation (49), "1" is added to a first term in the right side as compared with the equation (45). This prevents the correction coefficient from being zero and hence the fuel injection amount from being zero at the start of a control. At the start of the control, the initial values of the second and third terms in the right side are zero. Alternatively, the initial value of the third term (which is an integral term) may be set to 1 in place of using "1" in the first term.

Finally, the fuel control apparatus 131 adds the air/fuel ratio correction coefficient KAF to the smoothing coefficient Kcr#i as shown in the equation (50) for each cylinder to calculate an air/fuel ratio correction coefficient KAF#i for each cylinder.

$$KAF\#i(k) = Kcr\#i(k) + KAF(k) \quad (50)$$

The fuel injection amount of the fuel injector 18 is adjusted by the air/fuel ratio correction coefficient KAF#i for each cylinder, and the air/fuel ratios of all the cylinders can be smoothed.

The above-described correction coefficient KAF#i represents the second fuel correction amount of each cylinder which has been described above referring to FIG. 24.

The processes and behaviors of the related various parameters which have been described above for the output variation suppressing apparatus 30 referring to FIG. 3 through FIG. 9, FIG. 14 and FIG. 16 through FIG. 23 can be applied and implemented similarly in the output variation suppressing apparatus 30 shown in FIG. 24. Thus, description for these processes and behaviors will be omitted here.

Furthermore, in this embodiment, the ignition timing is determined as an operating parameter to be corrected in step S105 of FIG. 10 and step S204 of FIG. 12. A correction term (correction amount) C of the ignition timing is determined for each cylinder by referring to a map (table) as shown in FIG. 11(b) based on a torque error DTRQPARM. The current ignition timing is corrected with the ignition timing correction amount C as shown in the above-described equation (17-2). In the following process, this ignition timing correction amount C will be used.

Figure 28:
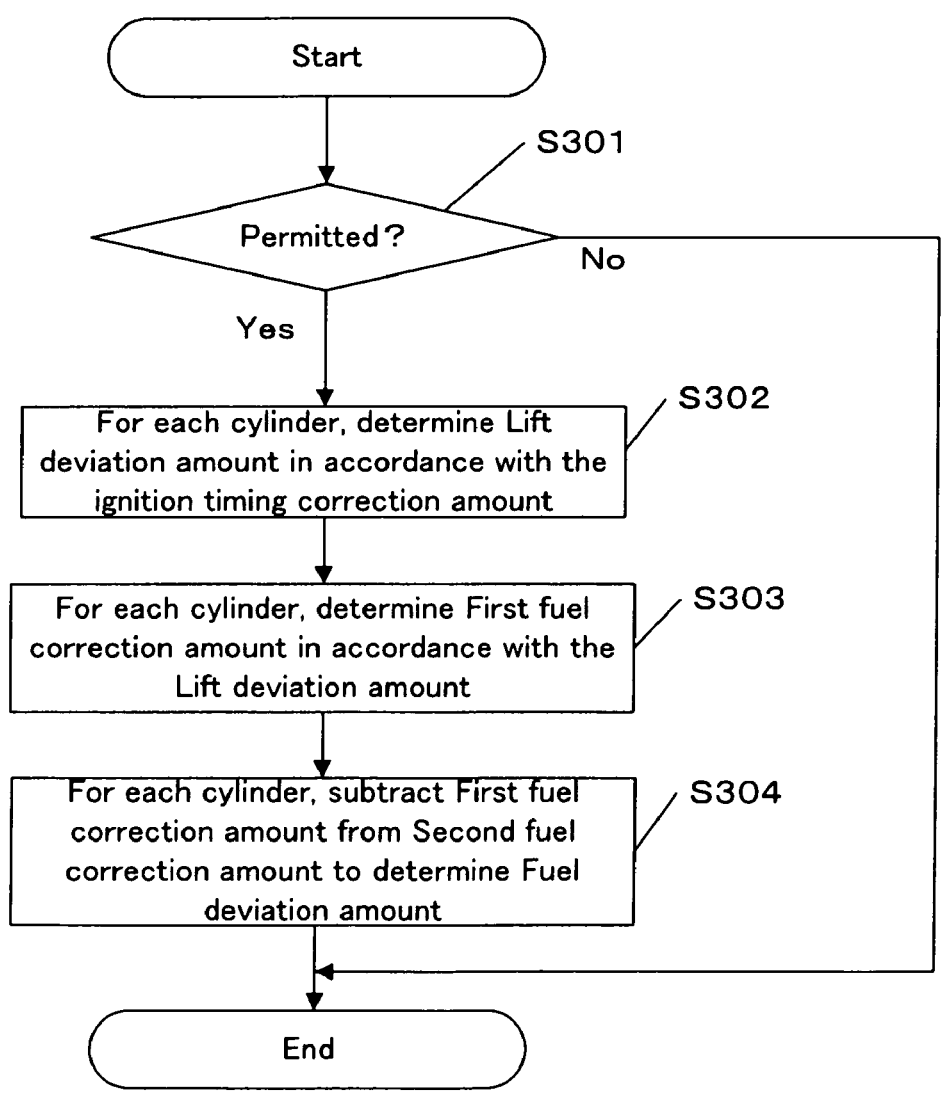
FIG. 28 is a flowchart of a process for determining an intake air deviation amount (a lift deviation amount) and a fuel deviation amount in accordance with one embodiment of the present invention.

FIG. 28 is a flowchart of a process for identifying deviations of the intake air amount and the fuel amount in accordance with one embodiment of the present invention. This process is executed at a predetermined time interval by the ECU 1, more specifically, by the intake air deviation amount determining part 133, the first fuel correction amount determining part 141 and the fuel deviation amount determining part 142.

In step S301, it is determined whether or not the engine is in an idle operating state. If the engine is in the idle operating state, execution of this process is permitted and the process proceeds to step S302.

Figure 29:
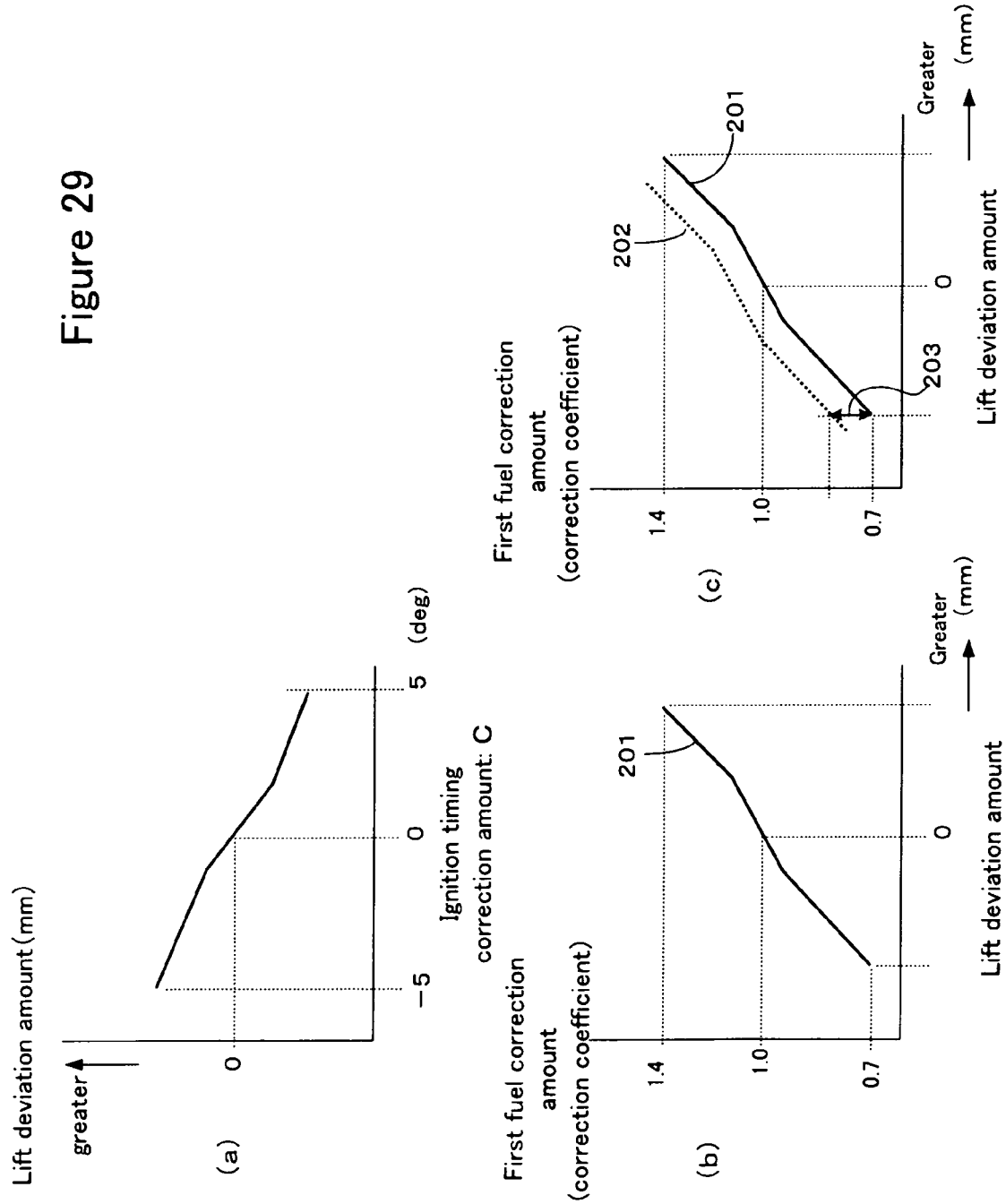
FIG. 29 shows (a) a table indicating a correlation between an ignition timing correction amount and a lift deviation amount, (b) a table indicating a correlation between a lift deviation amount and a first fuel correction amount and (c) an example of a fuel deviation amount in accordance with one embodiment of the present invention.

In step S302, for each cylinder, a lift deviation amount is determined by referring to a map (table) as shown in FIG. 29 based on the ignition timing correction amount C determined in step S106 of FIG. 10 or in step S205 of FIG. 12. As described above, the map defines a correlation between the ignition timing correction amount and the lift deviation amount when combustion in all the cylinders is maintained in the stoichiometric air/fuel ratio. This map indicates how much the lift amount of the intake valve deviates from a desired lift amount for the ignition timing correction amount. Such a map can be created in advance based on simulations or the like and stored in the memory (for example, non-volatile memory) of the ECU 1. As described above, the desired lift amount in this embodiment represents a predetermined value that is established to be used for an idle operating state. Although the range of ±30 degrees for the ignition timing correction amount is shown in FIG. 11(b), FIG. 29(a) shows only a range of ±5 degrees within the range of FIG. 11(b) in this example.

As shown in the map, the lift deviation amount increases toward the lower side as the ignition timing correction amount increases in the positive direction. An increase of the ignition timing correction amount (that is, advance of the ignition timing) indicates that the intake air amount is to be increased by the output variation suppressing apparatus 30 so as to increase the output torque. Therefore, the current state represented by the lift deviation amount indicates a shortage of the intake air amount. Thus, the deviation of the intake air amount is determined for each cylinder.

In step S303, for each cylinder, a map as shown in FIG. 29(b) is referred to based on the lift deviation amount determined in step S302 to determine a first fuel correction amount. In this embodiment, as described above, the map defines a correlation between the first fuel correction amount (represented by the correction coefficient) and the lift deviation amount when fuel required for placing all the cylinders under the stoichiometric air-fuel ratio is supplied to each cylinder. Accordingly, this map indicates how much of the first fuel correction amount with respect to the lift deviation amount is required for making the air/fuel ratio of each cylinder stoichiometric. Such a map can be prepared in advance based on simulations or the like and stored in the memory (for example, non-volatile memory) of the ECU 1.

As shown in the map, the first fuel correction amount increases in the positive direction as the lift deviation amount increases in the positive direction. This indicates that the fuel correction amount increases so as to make the air/fuel ratio stoichiometric as the lift deviation amount increases in the positive direction.

In step S304, for each cylinder, the first fuel correction amount determined in step S303 is subtracted from the second fuel correction amount that is output from the fuel control apparatus 131, to calculate a difference (a fuel deviation amount) between the first and second fuel correction amounts.

As shown in FIG. 29(b), when there is no variation in the fuel amount between the cylinders, the fuel correction amount with respect to the lift deviation amount should be positioned on the line 201. However, as shown in FIG. 29(c), which is the same as (b) except for addition of a line 202, if the second fuel correction amount determined by the fuel control apparatus 131 is positioned on the line 202, not on the line 201, it indicates that there is a deviation 203 in the second fuel correction amount. Therefore, the deviation 203 of the second fuel correction amount with respect to the first fuel correction amount is determined as a fuel deviation amount. Thus, the deviation of the fuel amount is determined for each cylinder.

Figure 30:
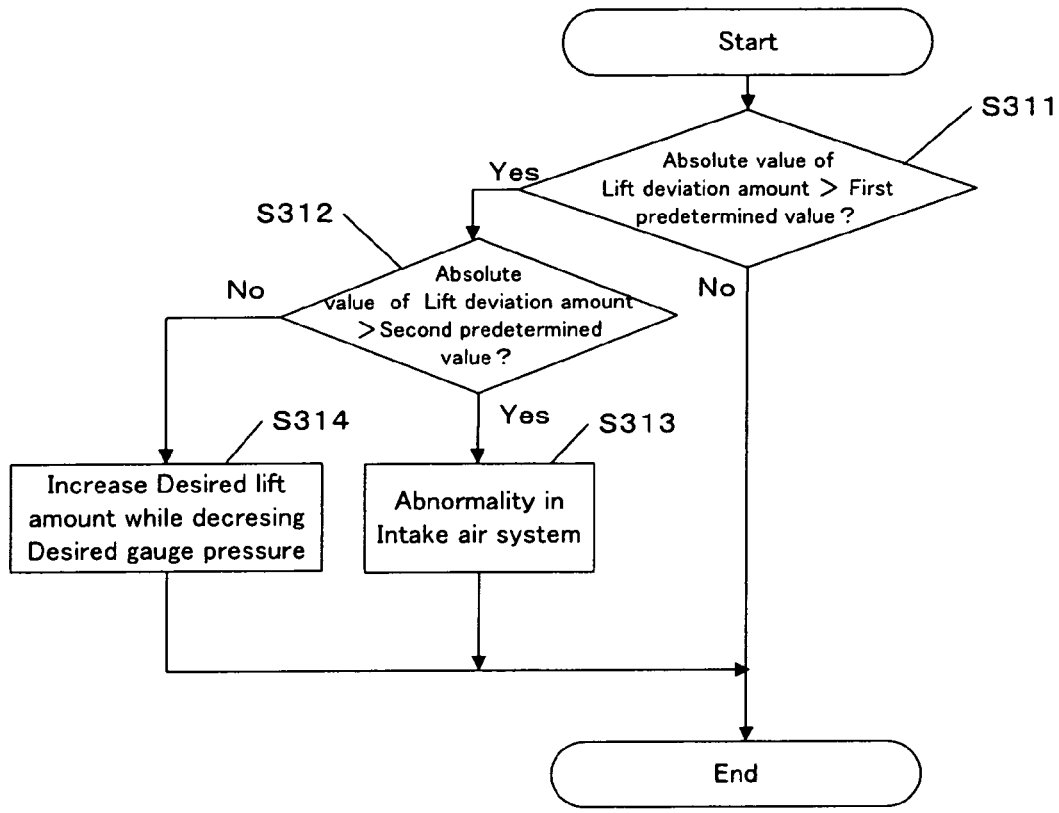
FIG. 30 is a flowchart of a process for determining an action based on a lift deviation amount in accordance with one embodiment of the present invention.

FIG. 30 is a flowchart of a process for determining an action in response to the deviation of the intake air amount, which is performed for each cylinder at a predetermined time interval. This process is carried out by the CPU of the ECU 1, more specifically, by the intake air system determination part 134 of FIG. 24.

In step S311, it is determined whether or not an absolute value of the lift deviation amount determined in step S302 of FIG. 28 is greater than a first predetermined value. If the answer of this step is No, it is determined that the lift deviation amount is small and hence has almost no influence on the smoothing operation on the output torque between the cylinders. The process is terminated here. If the answer of step S311 is Yes, it is determined in step S312 whether or not the lift deviation amount is greater than a second predetermined value (which is greater than the first predetermined value). If the answer of this step is Yes, it indicates that the lift deviation amount is relatively large. Thus, it is determined in step S313 that there is an abnormality in the intake air system of the subject cylinder. The abnormality can be informed by any appropriate means such as a warning light or the like.

If the answer of step S312 is No, it indicates that the lift deviation amount is between the first predetermined value and the second predetermined value. In step S314, the desired lift amount is increased so that the lift deviation amount does not affect the smoothing operation on the output torque between the cylinders (for example, the current desired lift amount is increases by 10%). In doing so, the ratio of the lift deviation amount with respect to the desired list amount becomes smaller. Therefore, the lift deviation amount can be restricted within an allowable range in which it does not affect the smoothing operation on the output torque. In order to maintain the desired intake air amount, the desired gauge pressure is decreased in accordance with the increase of the desired lift amount.

Figure 31:
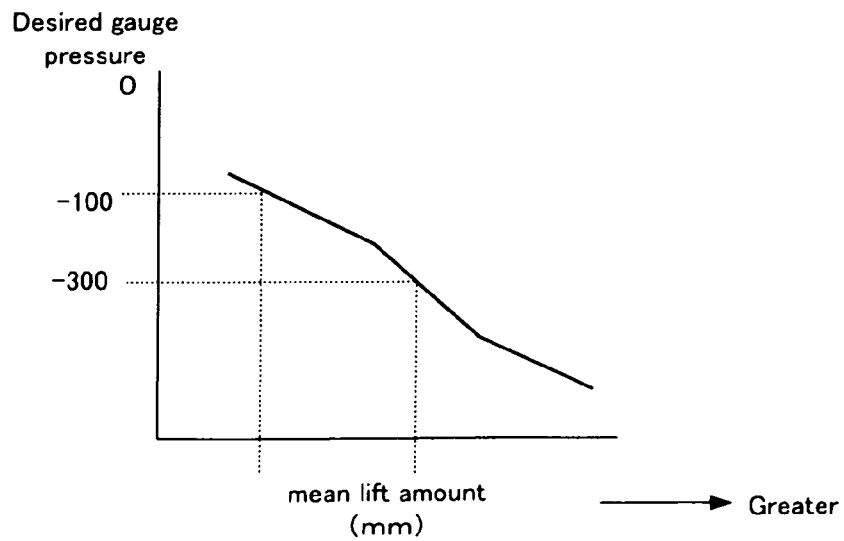
FIG. 31 shows a relationship between a desired lift amount and a desired gauge pressure in accordance with one embodiment of the present invention.

FIG. 31 shows a relationship between the desired lift amount and the desired gauge pressure so as to maintain the desired intake air amount to be introduced into the engine. Here, the desired lift amount has been determined depending on the operating condition of the engine. In this embodiment, the desired lift amount is set to a value used for an idle operating condition. In order to maintain the desired intake air amount at a constant value, the desired gauge pressure is decreased with the increase of the desired lift amount. In other words, the throttle valve is controlled toward the closed state as the lift amount is controlled to increase. In step S314, the increase of the desired lift amount and the decrease of the desired gauge pressure are performed in accordance with the map of FIG. 31.

Figure 32:
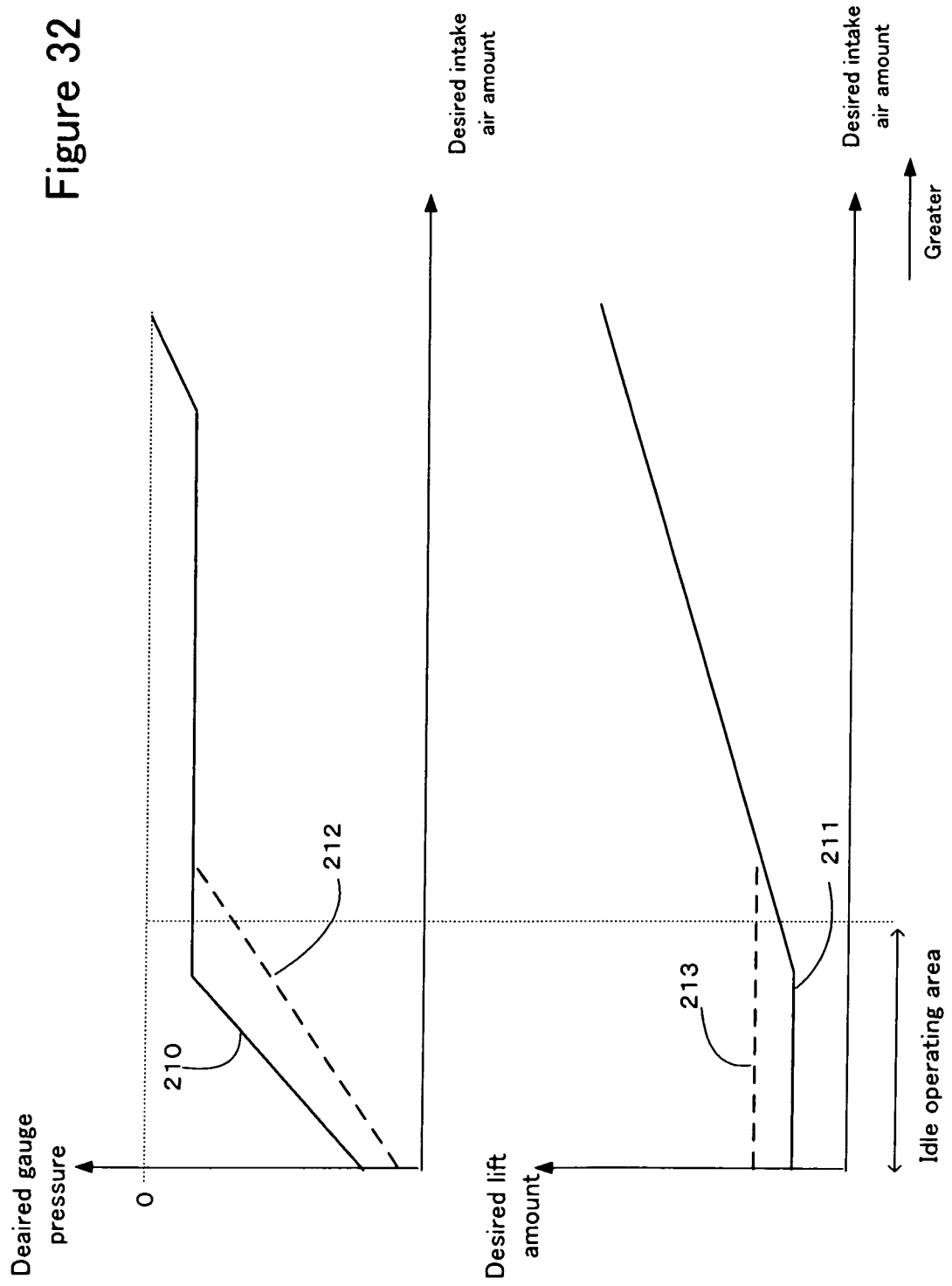
FIG. 32 schematically shows a control of increasing a desired lift amount and decreasing a desired gauge pressure in accordance with one embodiment of the present invention.

FIG. 32 shows, as an example, changes in the desired lift amount and the desired gauge pressure with respect to changes in the desired intake air amount. The desired intake air amount is achieved by implementing the desired lift amount and the desired gauge pressure through the variable lift mechanism and the throttle mechanism, respectively.

An area in which the desired intake air amount is small corresponds to the idle operating area. In the idle operating area, the intake air amount is adjusted mainly by the gauge pressure and the desired lift amount is maintained at an almost constant value up to a predetermined desired intake air amount. As the desired intake air amount increases beyond the idle operation area, the intake air amount is adjusted mainly by the lift amount and the gauge pressure is maintained at an almost constant value.

In the idle operating area, the intake valves of all the cylinders are controlled in accordance with the desired lift amount as shown by reference numeral 211 and the throttle valve is controlled in accordance with the desired gauge pressure as shown by reference numeral 210. When the control of step S314 of FIG. 30 is performed, the desired lift amount is increased to a line indicated by reference numeral 213 and the desired gauge pressure is decreased to a line indicated by reference numeral 212. Thus, the desired intake air amount is achieved regardless of the control of step S314.

Figure 33:
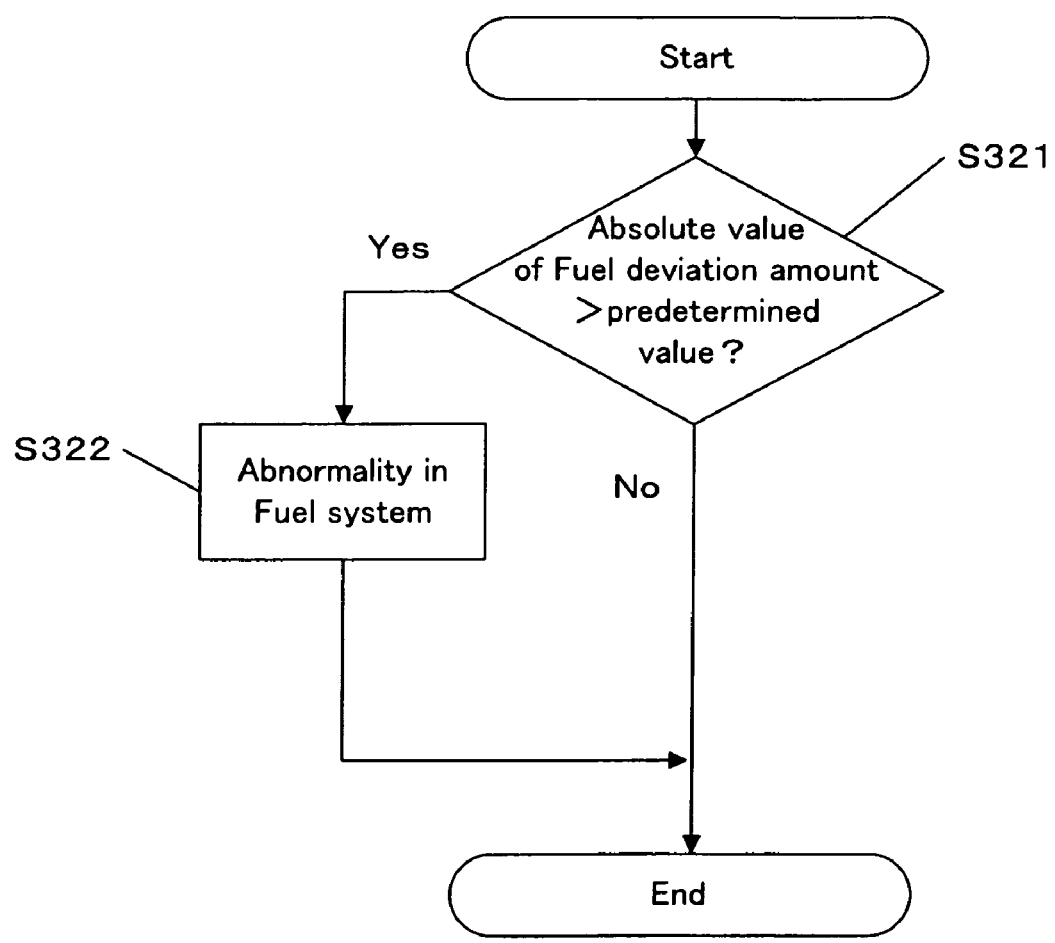
FIG. 33 is a flowchart of a process for determining an action based on a fuel deviation amount in accordance with one embodiment of the present invention.

FIG. 33 is a flowchart of a process for determining an action in response to the fuel deviation amount, which is performed for each cylinder at a predetermined time interval. This process is carried out by the CPU of the ECU 1, more specifically, by the fuel system determination part 143 of FIG. 24.

In step S321, it is determined whether or not an absolute value of the fuel deviation amount determined in step S304 of FIG. 28 is greater than a predetermined value. If the answer of this step is Yes, it indicates that the second correction amount determined by the fuel control apparatus 131 deviates significantly from the first fuel correction amount as described above. Thus, it is determined in step S322 that an abnormality has occurred in the fuel system for the subject cylinder. In this case, the abnormality can be informed by any appropriate means such as a warning light or the like.

Although the embodiments of the present invention have been described above with reference to a 6-cylinder engine as an example, the present invention can be applied to an engine having any number of cylinders.

Furthermore, the present invention can be applied to such an engine as a direct injection-type engine, a diesel engine or the like. Furthermore, the present invention can be applied to a general-purpose internal combustion engine (such as a vessel outboard motor or the like).

What is claimed is:

1. An apparatus for suppressing variations in the output between cylinders of an internal-combustion engine, the apparatus comprising a control unit configured to:
    detect a rotational speed parameter in accordance with a rotational speed of the engine;
    calculate a reference value of the rotational speed parameter;
    calculate as a relative speed parameter, for each cylinder, an error between the reference value and the rotational speed parameter detected every predetermined crank angle;
    integrate, for each cylinder, the relative speed parameter over a predetermined period to calculate an integrated value;
    calculate a first average value that is an average per cylinder of the sum of the integrated values of all of the cylinders;
    calculate, for each cylinder, an error between the integrated value of the cylinder and the first average value; and
    control, for each cylinder, the output of the engine in accordance with the error between the integrated value of the cylinder and the first average value calculated for the cylinder such that variations in the output between the cylinders are suppressed.

2. The apparatus of claim 1, wherein the control unit is further configured to calculate, for each cylinder, a second average value by averaging the integrated value of the cylinder over a predetermined period when the engine is in a predetermined operating condition,
    wherein the first average value is an average per cylinder of the sum of the second average values of all of the cylinders,
    wherein the error is an error, for each cylinder, between the second average value and the first average value that is an average per cylinder of the sum of the second average values of all of the cylinders.

3. The apparatus of claim 1, further comprising, for each cylinder, a fuel supply apparatus for supplying fuel to the cylinder and an ignition apparatus for igniting an air-fuel mixture in the cylinder,
    wherein the control unit is further configured to determine, based on the operating condition of the engine, whether or not correction for an amount of fuel supplied by the fuel supply apparatus and correction for an ignition timing at which the ignition apparatus ignites are permitted, and correct, for each cylinder, one or both of the fuel supply amount and the ignition timing for which the correction is permitted such that variations in the output between the cylinders are suppressed.

4. The apparatus of claim 1, further comprising, for each cylinder, a fuel supply apparatus for supplying fuel to the cylinder, an ignition apparatus for igniting an air-fuel mixture in the cylinder and a variable lift mechanism for variably changing a lift amount of an intake vale of the cylinder,
wherein the control unit is further configured to determine, based on the operating condition of the engine, whether or not correction for an amount of fuel supplied by the fuel supply apparatus, correction for an ignition timing at which the ignition apparatus ignites, and correction for a lift amount of the intake vale controlled by the variable lift mechanism are permitted, and correct, for each cylinder, one or more of the fuel supply amount, the ignition timing and the lift amount for which the correction is permitted such that variations in the output between the cylinders are suppressed.

5. A control apparatus for an internal-combustion engine having a plurality of cylinders, the apparatus comprising a control unit configured to:
detect a rotational speed parameter in accordance with a rotational speed of the engine;
calculate a reference value of the rotational speed parameter;
calculate as a relative speed parameter, for each cylinder, an error between the reference value and the rotational speed parameter detected every predetermined crank angle;
calculate, for each cylinder, an integrated value by integrating the relative speed parameter over a predetermined period;
determine, for each cylinder, an ignition timing correction amount for correcting an ignition timing based on the integrated value of the cylinder such that outputs of all the cylinders are smoothed;
control a fuel amount for each cylinder such that air-fuel ratios of all the cylinders are smoothed; and
distinguishably identify, for each cylinder, a deviation amount of an intake air amount of the cylinder from a first desired value and a deviation of the controlled fuel amount of the cylinder from a second desired value, in accordance with the ignition timing correction amount,
wherein the first desired value indicates an intake air amount when there is no variation in the intake air amount between the cylinders and the second desired value indicates a fuel amount when there is no variation, between the cylinders, in the fuel amount for smoothing the air-fuel ratios of all the cylinders.

6. The control apparatus of claim 5, wherein the control unit is further configured to determine, for each cylinder, the deviation amount of the intake air amount in accordance with the ignition timing correction amount and then determine, for each cylinder, the deviation amount of the fuel amount in accordance with the deviation amount of the intake air amount.

7. The control apparatus of claim 5, further comprising in a storage a first table defining a correlation between the ignition timing correction amount and the deviation amount of the intake air amount from the first desired value when the air/fuel ratios of all the cylinders are maintained at a predetermined value,
wherein the control unit is further configured to refer to, for each cylinder, the first table based on the ignition timing correction amount to determine the deviation amount of the intake air amount of the cylinder.

8. The control apparatus of claim 5, wherein the first desired value is a predetermined value that is established in advance in accordance with an operating condition of the engine.

9. The control apparatus of claim 5, further comprising in a storage a second table defining a correlation between the deviation amount of the intake air amount from the first desired value and a first fuel correction amount, when there is no variation, between the cylinders, in the fuel amount for smoothing the air-fuel ratios of all the cylinders,
wherein the control unit is further configured to refer to, for each cylinder, the second table based on the deviation amount of the intake air amount to determine the first fuel correction amount of the cylinder as the second desired value.

10. The control apparatus of claim 9, wherein the control unit is further configured to determine, for each cylinder, a second fuel correction amount of fuel supplied to the cylinder to control the fuel amount supplied to the cylinder and calculate, for each cylinder, a deviation amount of the second fuel correction amount from the second desired value as a deviation amount of the fuel amount.

11. The control apparatus of claim 5, wherein the control unit is further configured to determine, for each cylinder, whether or not the deviation amount of the intake air amount of the cylinder exceeds a predetermined value and determine that there is an abnormality in an intake air system of the cylinder if the deviation amount of the intake air amount of the cylinder exceeds the predetermined value.

12. The control apparatus of claim 5, wherein the control unit is further configured to determine, for each cylinder, whether or not the deviation amount of the fuel amount of the cylinder exceeds a predetermined value and determine that there is an abnormality in a fuel system of the cylinder if the deviation amount of the fuel amount exceeds the predetermined value.

13. The control apparatus of claim 5, further comprising:
lift control means that is capable of variably controlling a lift amount of an intake valve of the engine; and
pressure control means that is capable of controlling a pressure of an intake manifold of the engine,
wherein the control unit is further configured to, if the deviation amount of the intake air amount of any one of the cylinders exceeds a predetermined value, increase the lift amounts via the lift control means while decreasing the pressure via the pressure control means for all the cylinders.

14. The control apparatus of claim 5, wherein the control unit is further configured to perform the identification of the deviation amount of the intake air amount and the deviation amount of the fuel amount when the engine is in an idle operating condition.

15. A method for suppressing variations in the output between cylinders of an internal-combustion engine, comprising the steps of:
detecting a rotational speed parameter in accordance with a rotational speed of the engine;
calculating a reference value of the rotational speed parameter;
calculating as a relative speed parameter, for each cylinder, an error between the reference value and the rotational speed parameter detected every predetermined crank angle;

integrating, for each cylinder, the relative speed parameter over a predetermined period to calculate an integrated value;

calculating a first average value that is an average per cylinder of the sum of the integrated values of all of the cylinders;

calculating, for each cylinder, an error between the integrated value of the cylinder and the first average value; and controlling, for each cylinder, the output of the engine in accordance with the error between the integrated value of the cylinder and the first average value calculated for the cylinder such that variations in the output between the cylinders are suppressed.

16. The method of claim 15, further comprising calculating, for each cylinder, a second average value by averaging the integrated value of the cylinder over a predetermined period when the engine is in a predetermined operating condition, wherein the first average value is an average per cylinder of the sum of the second average values of all of the cylinders, wherein the error is an error, for each cylinder, between the second average value and the first average value that is an average per cylinder of the sum of the second average values of all of the cylinders.

17. The method of claim 15, further comprising:
determining, based on the operating condition of the engine, whether or not correction for an amount of fuel supplied to each cylinder and correction for an ignition timing at which an air-fuel mixture is ignited in each cylinder are permitted; and correcting, for each cylinder, one or both of the fuel supply amount and the ignition timing for which the correction is permitted such that variations in the output between the cylinders are suppressed.

18. The method of claim 15, further comprising:
determining, based on the operating condition of the engine, whether or not correction for an amount of fuel supplied to each cylinder, correction for an ignition timing at which an air-fuel mixture is ignited in each cylinder, and correction for a lift amount of an intake vale of each cylinder are permitted; and correcting, for each cylinder, one or more of the fuel supply amount, the ignition timing and the lift amount for which the correction is permitted such that variations in the output between the cylinders are suppressed.

19. A method for an internal-combustion engine having a plurality of cylinders, comprising:
detecting a rotational speed parameter in accordance with a rotational speed of the engine;

calculating a reference value of the rotational speed parameter;

calculating as a relative speed parameter, for each cylinder, an error between the reference value and the rotational speed parameter detected every predetermined crank angle;

calculating, for each cylinder, an integrated value by integrating the relative speed parameter over a predetermined period;

determining, for each cylinder, an ignition timing correction amount for correcting ignition timing based on the integrated value of the cylinder such that outputs of all the cylinders are smoothed;

controlling a fuel amount for each cylinder such that air-fuel ratios of all the cylinders are smoothed; and distinguishably identifying, for each cylinder, a deviation amount of an intake air amount of the cylinder from a first desired value in accordance with the ignition timing correction amount and a deviation of the controlled fuel amount of the cylinder from a second desired value in accordance with the ignition timing correction amount, wherein the first desired value indicates an intake air amount when there is no variation in the intake air amount between the cylinders and the second desired value indicates a fuel amount when there is no variation between the cylinders in the fuel amount for smoothing the air-fuel ratios of all the cylinders.

20. The method of claim 19, further comprising:
determining, for each cylinder, the deviation amount of the intake air amount in accordance with the ignition timing correction amount; and determining, for each cylinder, the deviation amount of the fuel amount in accordance with the deviation amount of the intake air amount.

21. The method of claim 19, further comprising:
providing a first table defining a correlation between the ignition timing correction amount and the deviation amount of the intake air amount from the first desired value when the air/fuel ratios of all the cylinders are maintained at a predetermined value; and referring to, for each cylinder, the first table based on the ignition timing correction amount to determine the deviation amount of the intake air amount of the cylinder.

22. The method of claim 19, wherein the first desired value is a predetermined value that is established in advance in accordance with an operating condition of the engine.

23. The method of claim 19, further comprising:
providing a second table defining a correlation between the deviation amount of the intake air amount from the first desired value and a first fuel correction amount, when there is no variation between the cylinders in the fuel amount for smoothing the air-fuel ratios of all the cylinders; and referring to, for each cylinder, the second table based on the deviation amount of the intake air amount to determine the first fuel correction amount of the cylinder as the second desired value.

24. The method of claim 23, further comprising:
determining, for each cylinder, a second fuel correction amount of fuel supplied to the cylinder to control the fuel amount supplied to the cylinder; and calculating, for each cylinder, a deviation amount of the second fuel correction amount from the second desired value as a deviation amount of the fuel amount.

25. The method of claim 19, further comprising:
determining, for each cylinder, whether or not the deviation amount of the intake air amount of the cylinder exceeds a predetermined value; and determining that there is an abnormality in an intake air system of the cylinder if the deviation amount of the intake air amount of the cylinder exceeds the predetermined value.

26. The method of claim 19, further comprising:
determining, for each cylinder, whether or not the deviation amount of the fuel amount of the cylinder exceeds a predetermined value; and determining that there is an abnormality in a fuel system of the cylinder if the deviation amount of the fuel amount exceeds the predetermined value.

27. The method of claim 19, further comprising:
if the deviation amount of the intake air amount of any one of the cylinders exceeds a predetermined value, increasing a lift amount of an intake valve for all the cylinders while decreasing a pressure of an intake manifold of the engine.

28. The method of claim 19, further comprising performing the identification of the deviation amount of the intake air amount and the deviation amount of the fuel amount when the engine is in an idle operating condition.

29. A computer program embodied on a computer readable medium for causing a computer to suppress variations in the output between cylinders of an internal-combustion engine, comprising the steps of:
detecting a rotational speed parameter in accordance with a rotational speed of the engine;
calculating a reference value of the rotational speed parameter;
calculating as a relative speed parameter, for each cylinder, an error between the reference value and the rotational speed parameter detected every predetermined crank angle;
integrating, for each cylinder, the relative speed parameter over a predetermined period to calculate an integrated value;
calculating a first average value that is an average per cylinder of the sum of the integrated values of all of the cylinders;
calculating, for each cylinder, an error between the integrated value of the cylinder and the first average value; and
controlling, for each cylinder, the output of the engine in accordance with the error between the integrated value of the cylinder and the first average value calculated for the cylinder such that variations in the output between the cylinders are suppressed.

30. The computer program of claim 29, further comprising calculating, for each cylinder, a second average value by averaging the integrated value of the cylinder over a predetermined period when the engine is in a predetermined operating condition,
wherein the first average value is an average per cylinder of the sum of the second average values of all of the cylinders,
wherein the error is an error, for each cylinder, between the second average value and the first average value that is an average per cylinder of the sum of the second average values of all of the cylinders.

31. The computer program of claim 29, further comprising:
determining, based on the operating condition of the engine, whether or not correction for an amount of fuel supplied to each cylinder and correction for an ignition timing at which an air-fuel mixture is ignited in each cylinder are permitted; and
correcting, for each cylinder, one or both of the fuel supply amount and the ignition timing for which the correction is permitted such that variations in the output between the cylinders are suppressed.

32. The computer program of claim 29, further comprising:
determining, based on the operating condition of the engine, whether or not correction for an amount of fuel supplied to each cylinder, correction for an ignition timing at which an air-fuel mixture is ignited in each cylinder, and correction for a lift amount of an intake vale of each cylinder are permitted; and
correcting, for each cylinder, one or more of the fuel supply amount, the ignition timing and the lift amount for which the correction is permitted such that variations in the output between the cylinders are suppressed.

33. A computer program embodied on a computer readable medium for causing a computer to a process for an internal-combustion engine having a plurality of cylinders, the process comprising the steps of:
detecting a rotational speed parameter in accordance with a rotational speed of the engine;
calculating a reference value of the rotational speed parameter;
calculating as a relative speed parameter, for each cylinder, an error between the reference value and the rotational speed parameter detected at every predetermined crank angle;
calculating, for each cylinder, an integrated value by integrating the relative speed parameter over a predetermined period;
determining, for each cylinder, an ignition timing correction amount for correcting ignition timing based on the integrated value of the cylinder such that outputs of all the cylinders are smoothed;
controlling a fuel amount for each cylinder such that air-fuel ratios of all the cylinders are smoothed; and
distinguishably identifying, for each cylinder, a deviation amount of an intake air amount of the cylinder from a first desired value and a deviation of the controlled fuel amount of the cylinder from a second desired value, in accordance with the ignition timing correction amount,
wherein the first desired value indicates an intake air amount when there is no variation in the intake air amount between the cylinders and the second desired value indicates a fuel amount when there is no variation between the cylinders in the fuel amount for smoothing the air-fuel ratios of all the cylinders.

34. The computer program of claim 33, the process further comprising:
determining, for each cylinder, the deviation amount of the intake air amount in accordance with the ignition timing correction amount; and
determining, for each cylinder, the deviation amount of the fuel amount in accordance with the deviation amount of the intake air amount.

35. The computer program of claim 33,
wherein the computer readable medium includes a first table defining a correlation between the ignition timing correction amount and the deviation amount of the intake air amount from the first desired value when the air/fuel ratios of all the cylinders are maintained at a predetermined value,
wherein the process comprises referring to, for each cylinder, the first table based on the ignition timing correction amount to determine the deviation amount of the intake air amount of the cylinder.

36. The computer program of claim 33, wherein the first desired value is a predetermined value that is established in advance in accordance with an operating condition of the engine.

37. The computer program of claim 33,
wherein the computer readable medium includes a second table defining a correlation between the deviation amount of the intake air amount from the first desired value and a first fuel correction amount, when there is no variation between the cylinders in the fuel amount for smoothing the air-fuel ratios of all the cylinders,
wherein the process comprises referring to, for each cylinder, the second table based on the deviation amount of the intake air amount to determine the first fuel correction amount of the cylinder as the second desired value.

38. The computer program of claim 37, the process further comprising:

determining, for each cylinder, a second fuel correction amount of fuel supplied to the cylinder to control the fuel amount supplied to the cylinder; and calculating, for each cylinder, a deviation amount of the second fuel correction amount from the second desired value as a deviation amount of the fuel amount.

39. The computer program of claim 33, further comprising:

determining, for each cylinder, whether or not the deviation amount of the intake air amount of the cylinder exceeds a predetermined value; and determining that there is an abnormality in an intake air system of the cylinder if the deviation amount of the intake air amount of the cylinder exceeds the predetermined value.

40. The computer program of claim 33, further comprising:

determining, for each cylinder, whether or not the deviation amount of the fuel amount of the cylinder exceeds a predetermined value; and determining that there is an abnormality in a fuel system of the cylinder if the deviation amount of the fuel amount exceeds the predetermined value.

41. The computer program of claim 33, further comprising:

if the deviation amount of the intake air amount of any one of the cylinders exceeds a predetermined value, increasing a lift amount of an intake valve for all the cylinders while decreasing a pressure of an intake manifold of the engine.

42. The computer program of claim 33, further comprising performing the identification of the deviation amount of the intake air amount and the deviation amount of the fuel amount when the engine is in an idle operating condition.

* * * * *